(12) United States Patent
Wang et al.

(10) Patent No.: US 10,616,933 B2
(45) Date of Patent: *Apr. 7, 2020

(54) FAST INITIAL LINK SETUP DISCOVERY FRAMES

(71) Applicant: InterDigital Patent Holdings, Inc., Wilmington, DE (US)

(72) Inventors: Lei Wang, San Diego, CA (US); Ronald Murias, Calgary (CA); Yousif Targali, Sammamish, WA (US); Guodong Zhang, Syosset, NY (US); Robert L. Olesen, Huntington, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/865,501

(22) Filed: Jan. 9, 2018

(65) Prior Publication Data

US 2018/0132295 A1    May 10, 2018

Related U.S. Application Data

(63) Continuation of application No. 14/985,669, filed on Dec. 31, 2015, now Pat. No. 9,888,503, which is a (Continued)

(51) Int. Cl.
*H04W 76/11* (2018.01)
*H04W 48/12* (2009.01)
(Continued)

(52) U.S. Cl.
CPC ............ *H04W 76/11* (2018.02); *H04W 48/12* (2013.01); *H04W 48/16* (2013.01);
(Continued)

(58) Field of Classification Search
CPC ............ H04W 76/021; H04W 52/0229; H04W 76/11; H04W 48/20
(Continued)

(56) References Cited

U.S. PATENT DOCUMENTS

| 7,376,398 B2 | 5/2008 | Roy et al. |
| 7,903,620 B2 | 3/2011 | Rudolf et al. |

(Continued)

FOREIGN PATENT DOCUMENTS

| EP | 2849499 B1 | 3/2015 |
| WO | 10/051119 | 5/2010 |
| WO | 11/056878 | 5/2011 |

OTHER PUBLICATIONS

Abraham et al., "Short Beacon," IEEE 802.11-11/1503r1, pp. 1-11 (Nov. 2011).

(Continued)

*Primary Examiner* — Iqbal Zaidi
(74) *Attorney, Agent, or Firm* — Volpe and Koenig, P.C.

(57) ABSTRACT

A method for fast initial link setup (FILS) for use in a wireless station, is disclosed. The method includes receiving a FILS discovery (FD) frame from an access point (AP). FD frame includes an FD frame control field and FD frame contents. The FD frame control field includes a capability presence indicator indicating whether a FD capability field is present in the FD frame contents. The method further includes determining to associate with the AP based on the received FD frame, and transmitting an association request frame to the AP.

20 Claims, 24 Drawing Sheets

Related U.S. Application Data continuation of application No. 13/933,401, filed on Jul. 2, 2013, now Pat. No. 9,232,548.

(60) Provisional application No. 61/667,600, filed on Jul. 3, 2012, provisional application No. 61/695,177, filed on Aug. 30, 2012.

(51) Int. Cl.
    *H04W 48/18* (2009.01)
    *H04W 84/12* (2009.01)
    *H04W 48/16* (2009.01)
    *H04W 36/00* (2009.01)

(52) U.S. Cl.
    CPC ........ *H04W 36/0061* (2013.01); *H04W 48/18* (2013.01); *H04W 84/12* (2013.01)

(58) Field of Classification Search
    USPC ................................................ 370/328–339
    See application file for complete search history.

(56) References Cited

U.S. PATENT DOCUMENTS

| | | | |
|---|---|---|---|
| 8,099,094 | B2 | 1/2012 | Marinier et al. |
| 8,131,209 | B1 | 3/2012 | Chen et al. |
| 8,374,122 | B2 | 2/2013 | Meier et al. |
| 8,780,871 | B2 | 7/2014 | Grandhi et al. |
| 2006/0285507 | A1 | 12/2006 | Kinder et al. |
| 2007/0192832 | A1 | 8/2007 | Qi et al. |
| 2007/0258384 | A1 | 11/2007 | Sammour et al. |
| 2009/0213751 | A1 | 8/2009 | Langefeld et al. |
| 2011/0310822 | A1 | 12/2011 | Nair et al. |
| 2012/0026941 | A1 | 2/2012 | Ahmed et al. |
| 2013/0107824 | A1 | 5/2013 | Cherian et al. |
| 2013/0176897 | A1 | 7/2013 | Wang et al. |
| 2013/0177002 | A1 | 7/2013 | Sun et al. |
| 2013/0230035 | A1 | 9/2013 | Grandhi et al. |
| 2013/0294232 | A1* | 11/2013 | Segev ............... H04W 28/06 370/230 |
| 2014/0254502 | A1* | 9/2014 | Cai .................. H04W 48/20 370/329 |

OTHER PUBLICATIONS

Abraham et al., "Short Beacon," IEEE 802.11-11/1503r2, pp. 1-11 (Nov. 2011).
Abraham et al., "Short Beacon," IEEE 802.11-12/0129r3, pp. 1-21 (May 2012).
Barber et al., "GAS Version Control including Normative Text," IEEE 802.11-yy/xxxxr0, IEEE 802.11-12-0053-01 (Nov. 2011).
Barber et al., "Proposed Additions to SFD," IEEE 802.11-12/0158r3 (Jan. 2012).
Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad D9.0 (Jul. 2012).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D0.1 (May 2013).
Draft Standard for Information Technology—Telecommunications and information exchange between systems—Local and metropolitan area networks—Specific requirements Part 11: Wireless LAN Medium Access Control (MAC) and Physical Layer (PHY) Specifications, IEEE P802.11ai™/D0.4 (Jan. 2013).
Emmelmann, "TGai Requirements Document," IEEE P802.11 Wireless LANs, IEEE 802.11-11/0745r5 (May 2011).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
Li et al., "AP Discovery with FILS Beacon," IEEE 802.11-12/0042r4 (Mar. 2012).
Morioka, "Air-time Consumption by Beacon and Probe," IEEE 802.11-11/1031r0 (Jul. 2011).
Park, Proposed Specification Framework for TGah, IEEE P802.11 Wireless LANs, IEEE 802.11-yy/xxxxr09 (May 2012).
Park, Proposed Specification Framework for TGah, IEEE P802.11 Wireless LANs, IEEE 802.11-11/1137r13 (Jan. 2013).
Siep et al., "Specification Framework for TGai," IEEE P802.11 Wireless LANs, IEEE 802.11-12/0151r7 (Jan. 2011).
Siep et al., "Specification Framework for TGai," IEEE P802.11 Wireless LANs, IEEE 802.11-12/0151r11 (Mar. 15, 2012).
Siep et al., "Specification Framework for TGai," IEEE P802.11 Wireless LANs, IEEE 802.11-12/0151r12 (Jul. 23, 2012) (incorrectly labelled IEEE 802.11-12/0151r7 on the submitted reference).
Wang et al., "Proposed SFD Text for 802.11ai Passive Scanning Improvement," IEEE 11-12-0406-05-00ai (May 2012).
Wang, "Ad Hoc Discussions of 802.11ai Passive Scanning during Jul. 2012 San Diego Meeting," IEEE 11-12-0913-03-00ai (Jul. 2012).
Wang, "Discussions about 802.11ai FILS Discovery (FD) Frame Content Design," IEEE 11-12-1030-00-00ai (Sep. 2012).
Wang, "Discussions about 802.11ai FILS Discovery Frame (DF) Content Design," IEEE 11-12-0741-01-00ai (Jul. 2012).
Wang, "Frame Format Design Considerations for 802.11ai FILS Discovery Frame," IEEE 11-12-0742-00-00ai (Jul. 2012).
Wang, "Further Discussions about FILS Discovery (FD) Frame Format Design," IEEE 11-12-1237-01-00ai (Nov. 2012).
Wang, "Passive Scanning Improvement Ad Hoc Report," IEEE 11-12-0669-01-00ai (May 2012).
Wong et al., "Proposed TGah Draft Amendment," IEEE P802.11 Wireless LANs, IEEE 802.11-13/0500r0 (May 2013).
Park, Proposed Specification Framework for TGah, IEEE P802.11 Wireless LANs, IEEE 802.11-11/1137r15 (May 2013).

\* cited by examiner

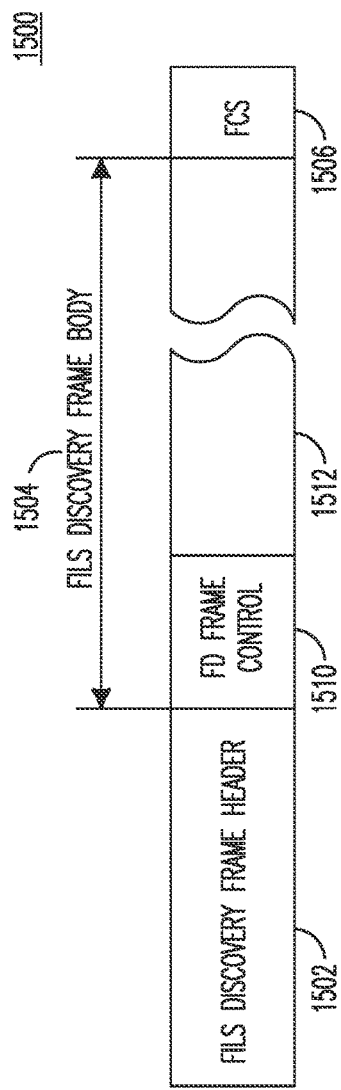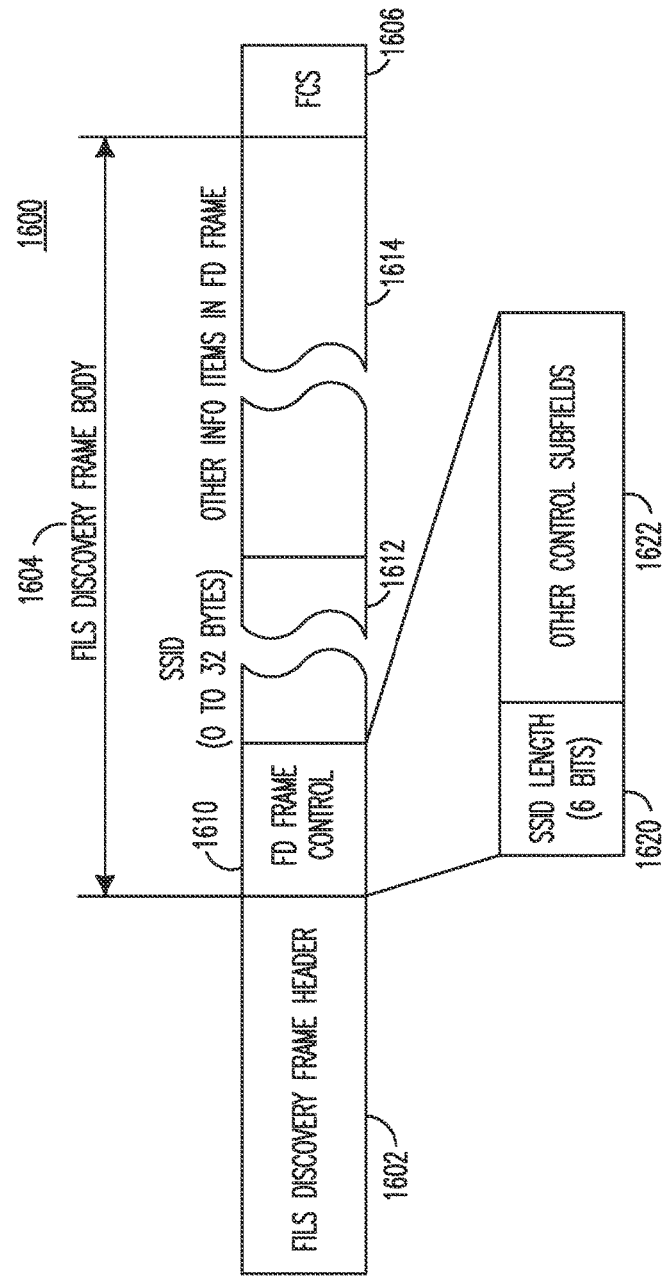

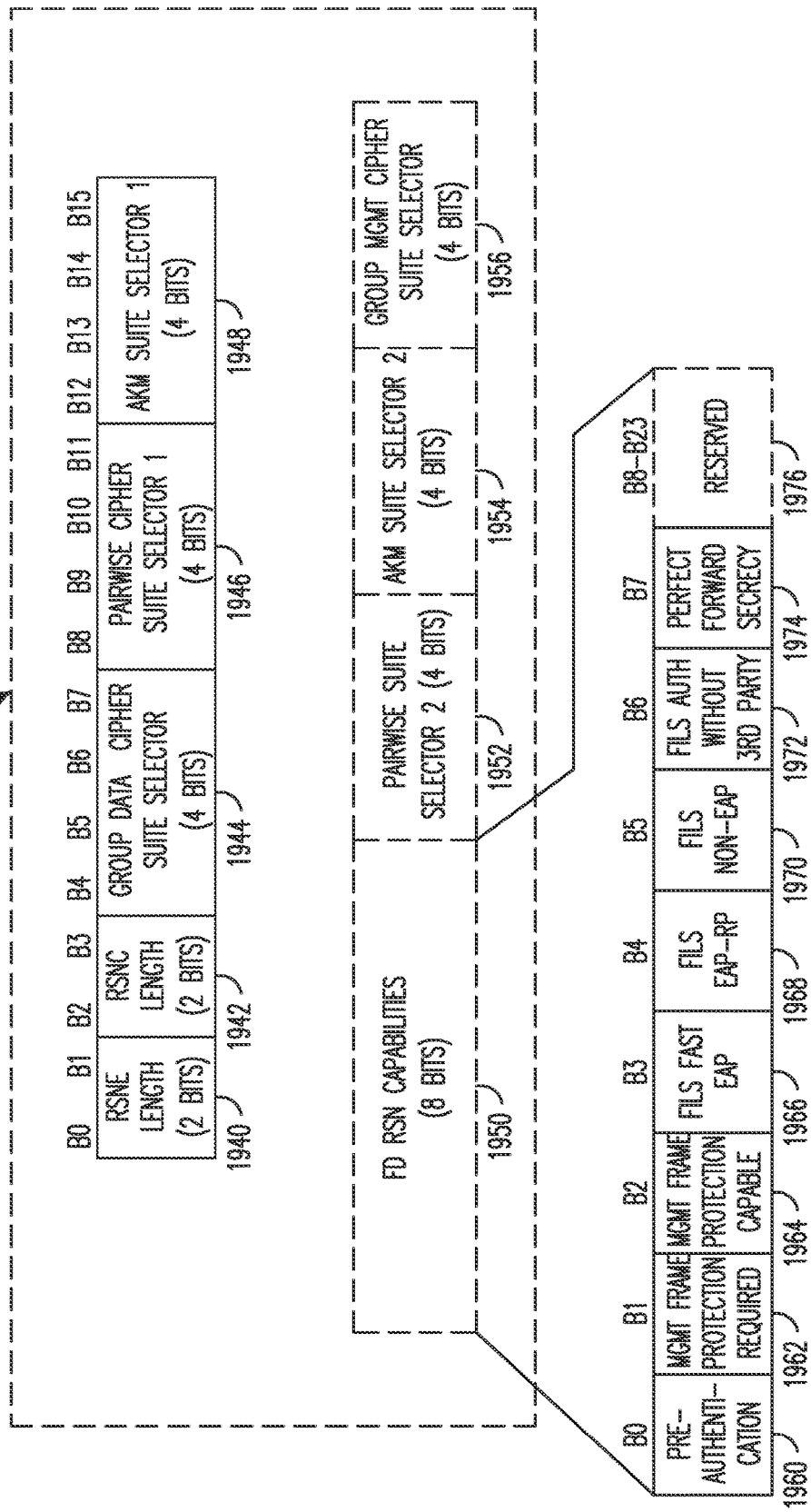

FAST INITIAL LINK SETUP DISCOVERY FRAMES

CROSS REFERENCE TO RELATED APPLICATIONS

This application is a continuation of U.S. patent application Ser. No. 14/985,669 filed Dec. 31, 2015, which is a continuation of U.S. patent application Ser. No. 13/933,401 filed Jul. 2, 2013, which issued as U.S. Pat. No. 9,232,548 on Jan. 5, 2016, which claims the benefit of U.S. Provisional Patent Application No. 61/667,600 filed Jul. 3, 2012, and U.S. Provisional Patent Application No. 61/695,177 filed Aug. 30, 2012, the contents of which are hereby incorporated by reference herein.

BACKGROUND

A wireless local area network (WLAN) in the infrastructure basic service set (BSS) mode has an access point (AP) for the BSS, and one or more stations (STAs) associated with the AP. The AP typically has access to or interfaces with a distribution system (DS) or another type of wired/wireless network that carries traffic in to and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may also be sent through the AP where the source STA sends traffic to the AP and the AP delivers the traffic to the destination STA. Such traffic between STAs within a BSS is really peer-to-peer traffic. Such peer-to-peer traffic may also be sent directly between the source and destination STAs with a direct link setup (DLS) or a tunneled DLS (TDLS). A WLAN in independent BSS mode (IBSS) has no AP and STAs communicate directly with each other.

In an infrastructure BSS, a STA performs a scanning procedure to discover an appropriate AP/network to establish a WLAN link, usually via an association procedure. There are two basic scanning modes: passive scanning and active scanning.

With the passive scanning mode, the AP periodically transmits beacon frames to provide AP/network information to the STA. The beacon supports various functions in the system by providing an AP advertisement with a BSS identifier (BSSID), synchronization of the STAs in the BSS, capability information, BSS operation information, system parameters for medium access, transmit power limits, etc. In addition, the beacon may carry many optional information elements.

With the active scanning mode, the STA actively generates and transmits a probe request frame to the AP, receives a probe response frame from the AP, and processes the probe response frame to acquire the AP/network information.

FIG. 1 shows a general frame format for a beacon frame 100, which includes a medium access control (MAC) header 102, a frame body 104, and a frame check sequence (FCS) field 106. The MAC header 102 includes a frame control field 110, a duration field 112, multiple address fields 114-118, a sequence control field 120, and a high throughput (HT) control field 122.

The frame body 104 includes mandatory fields and information elements (IEs), including, but not limited to (not shown in FIG. 1): a timestamp field, a beacon interval field, a capability field, a service set identifier (SSID) field, a supported rates field, and one or more optional IEs, such as BSS load information. The BSS load information indicates the level of traffic loading at the BSS, and may include five relevant IEs: BSS load, including STA count, channel utilization, and admission capability; BSS available admission capacity; quality of service (QoS) traffic capability; BSS average access delay; and BSS access category (AC) access delay. With the mandatory and typical optional IEs, beacon frames may be over 100 bytes long. In a typical enterprise environment, the beacons are approximately 230 bytes long.

A goal with fast initial link setup (FILS) is to support an initial link setup time for STAs within 100 ms and to support at least 100 non-AP STAs simultaneously entering the BSS and fast link setup within one second. Because beacons may be used to provide information about the AP to the STAs at the beginning of the initial link setup process, beacons may include information to facilitate a fast link setup to satisfy the specified functional requirements.

The FILS process consists of five phases: (1) AP discovery; (2) network discovery; (3) additional timing synchronization function (TSF); (4) authentication and association; (5) higher layer IP setup.

SUMMARY

A method for fast initial link setup (FILS) for use in a wireless station, is disclosed. The method includes receiving a FILS discovery (FD) frame from an access point (AP). FD frame includes an FD frame control field and FD frame contents. The FD frame control field includes a capability presence indicator indicating whether a FD capability field is present in the FD frame contents. The method further includes determining to associate with the AP based on the received FD frame, and transmitting an association request frame to the AP.

A wireless station comprising a receiver, transmitter, and processor is also disclosed. The receiver is configured to receive a FILS discovery (FD) frame from an AP. The FD frame includes an FD frame control field and FD frame contents. The FD frame control field includes a capability presence indicator indicating whether a FD capability field is present in the FD frame contents. The processor is configured to determine to associate with the AP based on the received FD frame. The transmitter is configured to transmit an association request frame to the AP.

BRIEF DESCRIPTION OF THE DRAWINGS

A more detailed understanding may be had from the following description, given by way of example in conjunction with the accompanying drawings, wherein:

FIG. 15 is a diagram of a FD frame control field format;

FIGS. 16A-16B are diagrams of exemplary FD frame SSID designs;

FIGS. 19A-19B are diagrams of a variable length FD frame security information item format;

DETAILED DESCRIPTION

Figure 1:
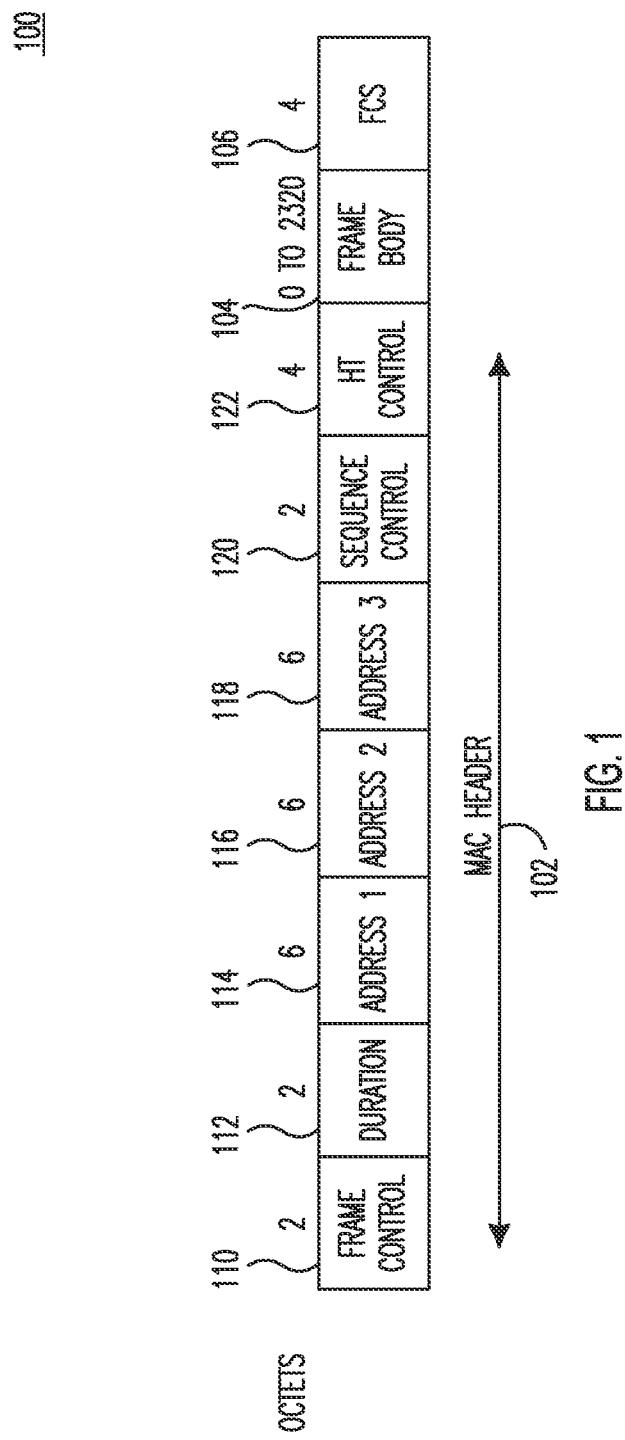
FIG. 1 is a diagram of a beacon frame format.
Figure 2A:
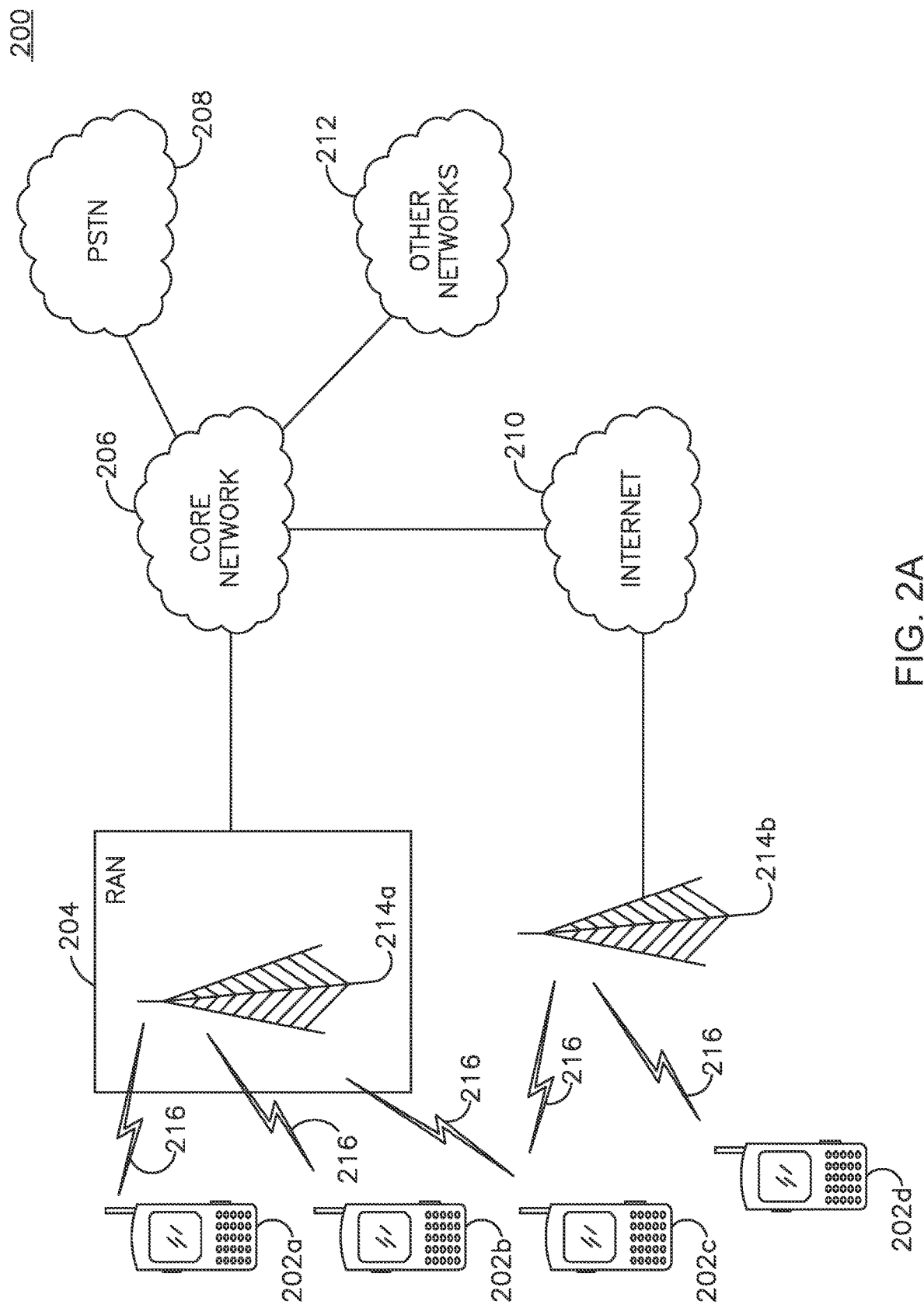
FIG. 2A is a system diagram of an example communications system in which one or more disclosed embodiments may be implemented.

FIG. 2A is a diagram of an example communications system 200 in which one or more disclosed embodiments may be implemented. The communications system 200 may be a multiple access system that provides content, such as voice, data, video, messaging, broadcast, etc., to multiple wireless users. The communications system 200 may enable multiple wireless users to access such content through the sharing of system resources, including wireless bandwidth. For example, the communications systems 200 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 2A, the communications system 200 may include wireless transmit/receive units (WTRUs) 202a, 202b, 202c, 202d, a radio access network (RAN) 204, a core network 206, a public switched telephone network (PSTN) 208, the Internet 210, and other networks 212, though it will be appreciated that the disclosed embodiments contemplate any number of WTRUs, base stations, networks, and/or network elements. Each of the WTRUs 202a, 202b, 202c, 202d may be any type of device configured to operate and/or communicate in a wireless environment. By way of example, the WTRUs 202a, 202b, 202c, 202d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 200 may also include a base station 214a and a base station 214b. Each of the base stations 214a, 214b may be any type of device configured to wirelessly interface with at least one of the WTRUs 202a, 202b, 202c, 202d to facilitate access to one or more communication networks, such as the core network 206, the Internet 210, and/or the other networks 212. By way of example, the base stations 214a, 214b may be a base transceiver station (BTS), a Node-B, an eNode B, a Home Node B, a Home eNode B, a site controller, an access point (AP), a wireless router, and the like. While the base stations 214a, 214b are each depicted as a single element, it will be appreciated that the base stations 214a, 214b may include any number of interconnected base stations and/or network elements.

The base station 214a may be part of the RAN 204, which may also include other base stations and/or network elements (not shown), such as a base station controller (BSC), a radio network controller (RNC), relay nodes, etc. The base station 214a and/or the base station 214b may be configured to transmit and/or receive wireless signals within a particular geographic region, which may be referred to as a cell (not shown). The cell may further be divided into cell sectors. For example, the cell associated with the base station 214a may be divided into three sectors. Thus, in one embodiment, the base station 214a may include three transceivers, i.e., one for each sector of the cell. In another embodiment, the base station 214a may employ multiple-input multiple-output (MIMO) technology and, therefore, may utilize multiple transceivers for each sector of the cell.

The base stations 214a, 214b may communicate with one or more of the WTRUs 202a, 202b, 202c, 202d over an air interface 216, which may be any suitable wireless communication link (for example, radio frequency (RF), microwave, infrared (IR), ultraviolet (UV), visible light, etc.). The air interface 216 may be established using any suitable radio access technology (RAT).

More specifically, as noted above, the communications system 200 may be a multiple access system and may employ one or more channel access schemes, such as CDMA, TDMA, FDMA, OFDMA, SC-FDMA, and the like. For example, the base station 214a in the RAN 204 and the WTRUs 202a, 202b, 202c may implement a radio technology such as Universal Mobile Telecommunications System (UMTS) Terrestrial Radio Access (UTRA), which may establish the air interface 216 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 214a and the WTRUs 202a, 202b, 202c may implement a radio technology such as Evolved UMTS Terrestrial Radio Access (E-UTRA), which may establish the air interface 216 using Long Term Evolution (LTE) and/or LTE-Advanced (LTE-A).

In other embodiments, the base station 214a and the WTRUs 202a, 202b, 202c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 214b in FIG. 2A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 214b and the WTRUs 202c, 202d may implement a radio technology such as IEEE 802.11 to establish a wireless local area network (WLAN). In another embodiment, the base station 214b and the WTRUs 202c, 202d may implement a radio technology such as IEEE 802.15 to establish a wireless personal area network (WPAN). In yet another embodiment, the base station 214b and the WTRUs 202c, 202d may utilize a cellular-based RAT (for example, WCDMA, CDMA2000, GSM, LTE, LTE-A, etc.) to establish a picocell or femtocell. As shown in FIG. 2A, the base station 214b may have a direct connection to the Internet 210. Thus, the base station 214b may not be required to access the Internet 210 via the core network 206.

The RAN 204 may be in communication with the core network 206, which may be any type of network configured to provide voice, data, applications, and/or voice over internet protocol (VoIP) services to one or more of the WTRUs 202a, 202b, 202c, 202d. For example, the core network 206 may provide call control, billing services, mobile location-based services, pre-paid calling, Internet connectivity, video distribution, etc., and/or perform high-level security functions, such as user authentication. Although not shown in FIG. 2A, it will be appreciated that the RAN 204 and/or the core network 206 may be in direct or indirect communication with other RANs that employ the same RAT as the RAN 204 or a different RAT. For example, in addition to being connected to the RAN 204, which may be utilizing an E-UTRA radio technology, the core network 206 may also be in communication with another RAN (not shown) employing a GSM radio technology.

The core network 206 may also serve as a gateway for the WTRUs 202a, 202b, 202c, 202d to access the PSTN 208, the Internet 210, and/or other networks 212. The PSTN 208 may include circuit-switched telephone networks that provide plain old telephone service (POTS). The Internet 210 may include a global system of interconnected computer networks and devices that use common communication protocols, such as the transmission control protocol (TCP), user datagram protocol (UDP) and the internet protocol (IP) in the TCP/IP internet protocol suite. The networks 212 may include wired or wireless communications networks owned and/or operated by other service providers. For example, the networks 212 may include another core network connected to one or more RANs, which may employ the same RAT as the RAN 204 or a different RAT.

Some or all of the WTRUs 202a, 202b, 202c, 202d in the communications system 200 may include multi-mode capabilities, i.e., the WTRUs 202a, 202b, 202c, 202d may include multiple transceivers for communicating with different wireless networks over different wireless links. For example, the WTRU 202c shown in FIG. 2A may be configured to communicate with the base station 214a, which may employ a cellular-based radio technology, and with the base station 214b, which may employ an IEEE 802 radio technology.

Figure 2B:
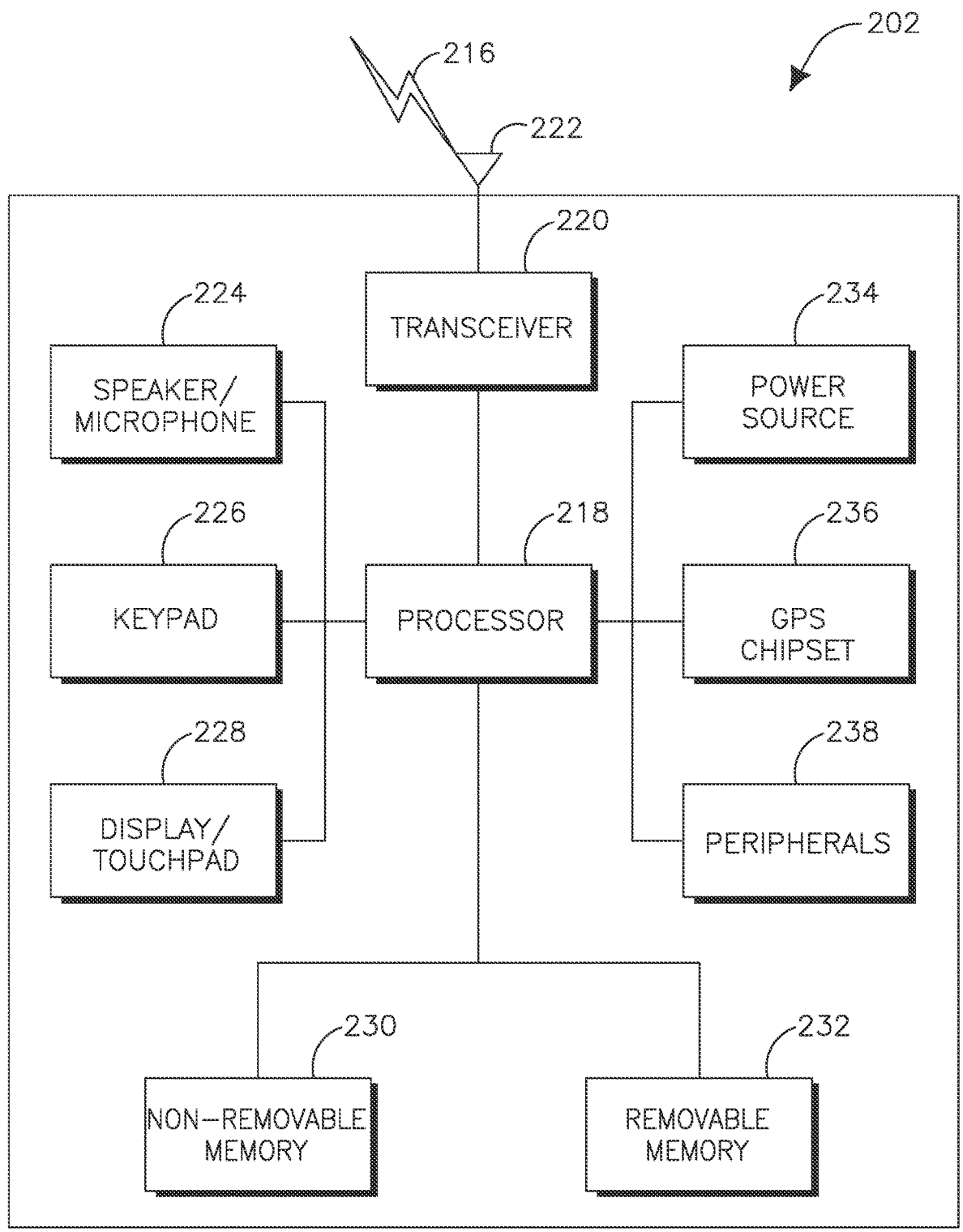
FIG. 2B is a system diagram of an example wireless transmit/receive unit (WTRU) that may be used within the communications system illustrated in FIG. 2A.

FIG. 2B is a system diagram of an example WTRU 202. As shown in FIG. 2B, the WTRU 202 may include a processor 218, a transceiver 220, a transmit/receive element 222, a speaker/microphone 224, a keypad 226, a display/touchpad 228, non-removable memory 230, removable memory 232, a power source 234, a global positioning system (GPS) chipset 236, and other peripherals 238. It will be appreciated that the WTRU 202 may include any sub-combination of the foregoing elements while remaining consistent with an embodiment.

The processor 218 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (10), a state machine, and the like. The processor 218 may perform signal coding, data processing, power control, input/output processing, and/or any other functionality that enables the WTRU 202 to operate in a wireless environment. The processor 218 may be coupled to the transceiver 220, which may be coupled to the transmit/receive element 222. While FIG. 2B depicts the processor 218 and the transceiver 220 as separate components, it will be appreciated that the processor 218 and the transceiver 220 may be integrated together in an electronic package or chip.

The transmit/receive element 222 may be configured to transmit signals to, or receive signals from, a base station (for example, the base station 214a) over the air interface 216. For example, in one embodiment, the transmit/receive element 222 may be an antenna configured to transmit and/or receive RF signals. In another embodiment, the transmit/receive element 222 may be an emitter/detector configured to transmit and/or receive IR, UV, or visible light signals, for example. In yet another embodiment, the transmit/receive element 222 may be configured to transmit and receive both RF and light signals. It will be appreciated that the transmit/receive element 222 may be configured to transmit and/or receive any combination of wireless signals.

In addition, although the transmit/receive element 222 is depicted in FIG. 2B as a single element, the WTRU 202 may include any number of transmit/receive elements 222. More specifically, the WTRU 202 may employ MIMO technology. Thus, in one embodiment, the WTRU 202 may include two or more transmit/receive elements 222 (for example, multiple antennas) for transmitting and receiving wireless signals over the air interface 216.

The transceiver 220 may be configured to modulate the signals that are to be transmitted by the transmit/receive element 222 and to demodulate the signals that are received by the transmit/receive element 222. As noted above, the WTRU 202 may have multi-mode capabilities. Thus, the transceiver 220 may include multiple transceivers for enabling the WTRU 202 to communicate via multiple RATs, such as UTRA and IEEE 802.11, for example.

The processor 218 of the WTRU 202 may be coupled to, and may receive user input data from, the speaker/microphone 224, the keypad 226, and/or the display/touchpad 228 (for example, a liquid crystal display (LCD) display unit or organic light-emitting diode (OLED) display unit). The processor 218 may also output user data to the speaker/microphone 224, the keypad 226, and/or the display/touchpad 228. In addition, the processor 218 may access information from, and store data in, any type of suitable memory, such as the non-removable memory 230 and/or the removable memory 232. The non-removable memory 230 may include random-access memory (RAM), read-only memory (ROM), a hard disk, or any other type of memory storage device. The removable memory 232 may include a subscriber identity module (SIM) card, a memory stick, a secure digital (SD) memory card, and the like. In other embodiments, the processor 218 may access information from, and store data in, memory that is not physically located on the WTRU 202, such as on a server or a home computer (not shown).

The processor 218 may receive power from the power source 234, and may be configured to distribute and/or control the power to the other components in the WTRU 202. The power source 234 may be any suitable device for powering the WTRU 202. For example, the power source 234 may include one or more dry cell batteries (for example, nickel-cadmium (NiCd), nickel-zinc (NiZn), nickel metal hydride (NiMH), lithium-ion (Li-ion), etc.), solar cells, fuel cells, and the like.

The processor 218 may also be coupled to the GPS chipset 236, which may be configured to provide location information (for example, longitude and latitude) regarding the current location of the WTRU 202. In addition to, or in lieu of, the information from the GPS chipset 236, the WTRU 202 may receive location information over the air interface 216 from a base station (for example, base stations 214a, 214b) and/or determine its location based on the timing of the signals being received from two or more nearby base stations. It will be appreciated that the WTRU 202 may acquire location information by way of any suitable location-determination method while remaining consistent with an embodiment.

The processor 218 may further be coupled to other peripherals 238, which may include one or more software and/or hardware modules that provide additional features, functionality and/or wired or wireless connectivity. For example, the peripherals 238 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 2C:
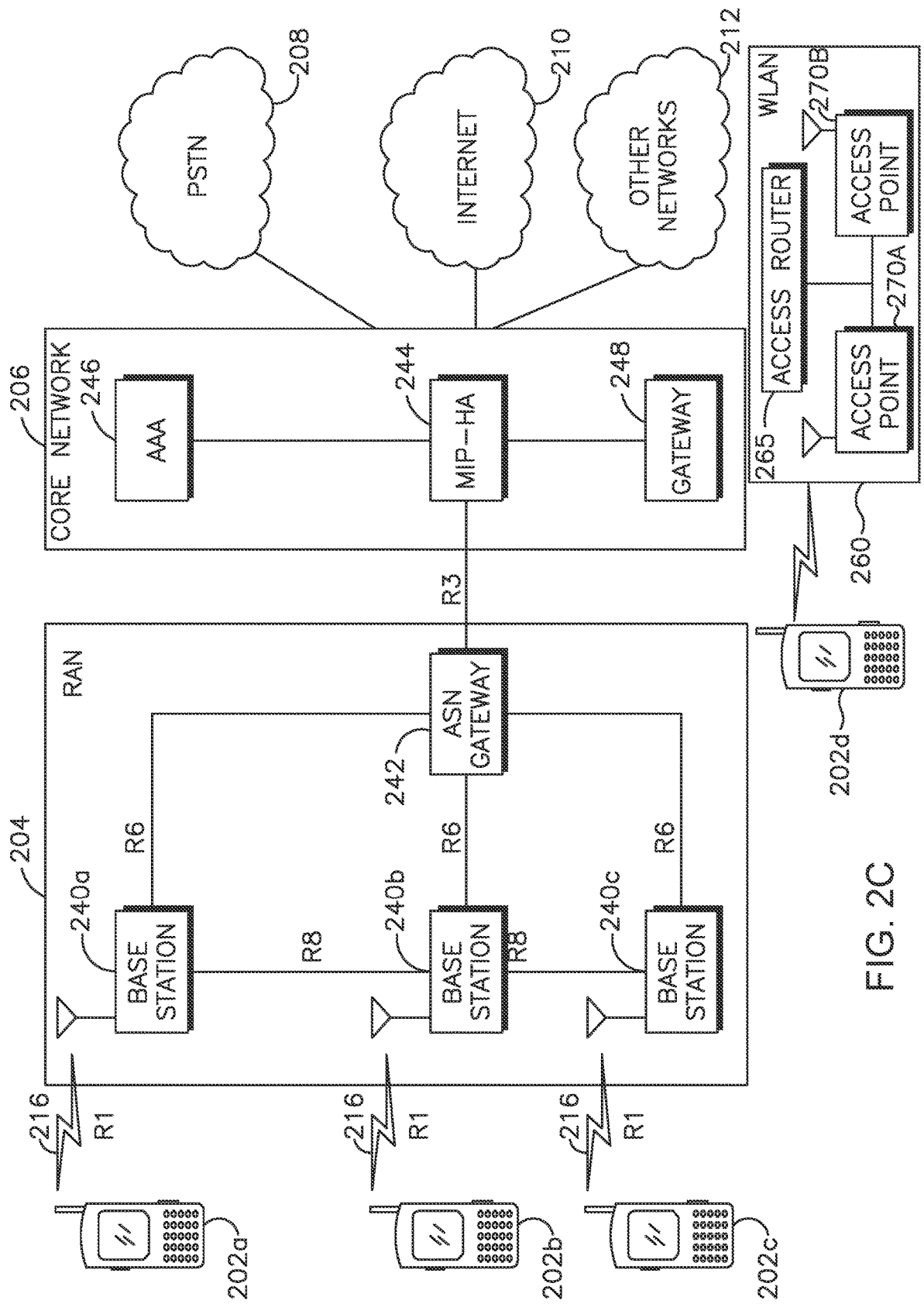
FIG. 2C is a system diagram of an example radio access network and an example core network that may be used within the communications system illustrated in FIG. 2A.

FIG. 2C is a system diagram of the RAN 204 and the core network 206 according to an embodiment. The RAN 204 may be an access service network (ASN) that employs IEEE 802.16 radio technology to communicate with the WTRUs 202a, 202b, 202c over the air interface 216. As will be further discussed below, the communication links between the different functional entities of the WTRUs 202a, 202b, 202c, the RAN 204, and the core network 206 may be defined as reference points.

As shown in FIG. 2C, the RAN 204 may include base stations 240a, 240b, 240c, and an ASN gateway 242, though it will be appreciated that the RAN 204 may include any number of base stations and ASN gateways while remaining consistent with an embodiment. The base stations 240a, 240b, 240c may each be associated with a particular cell (not shown) in the RAN 204 and may each include one or more transceivers for communicating with the WTRUs 202a, 202b, 202c over the air interface 216. In one embodiment, the base stations 240a, 240b, 240c may implement MIMO technology. Thus, the base station 240a, for example, may use multiple antennas to transmit wireless signals to, and receive wireless signals from, the WTRU 202a. The base stations 240a, 240b, 240c may also provide mobility management functions, such as handoff triggering, tunnel establishment, radio resource management, traffic classification, quality of service (QoS) policy enforcement, and the like. The ASN gateway 242 may serve as a traffic aggregation point and may be responsible for paging, caching of subscriber profiles, routing to the core network 206, and the like.

The air interface 216 between the WTRUs 202a, 202b, 202c and the RAN 204 may be defined as an R1 reference point that implements the IEEE 802.16 specification. In addition, each of the WTRUs 202a, 202b, 202c may establish a logical interface (not shown) with the core network 206. The logical interface between the WTRUs 202a, 202b, 202c and the core network 206 may be defined as an R2 reference point, which may be used for authentication, authorization, IP host configuration management, and/or mobility management.

The communication link between each of the base stations 240a, 240b, 240c may be defined as an R8 reference point that includes protocols for facilitating WTRU handovers and the transfer of data between base stations. The communication link between the base stations 240a, 240b, 240c and the ASN gateway 242 may be defined as an R6 reference point. The R6 reference point may include protocols for facilitating mobility management based on mobility events associated with each of the WTRUs 202a, 202b, 202c.

As shown in FIG. 2C, the RAN 204 may be connected to the core network 206. The communication link between the RAN 204 and the core network 206 may defined as an R3 reference point that includes protocols for facilitating data transfer and mobility management capabilities, for example. The core network 206 may include a mobile IP home agent (MIP-HA) 244, an authentication, authorization, accounting (AAA) server 246, and a gateway 248. While each of the foregoing elements are depicted as part of the core network 206, it will be appreciated that any one of these elements may be owned and/or operated by an entity other than the core network operator.

The MIP-HA may be responsible for IP address management, and may enable the WTRUs 202a, 202b, 202c to roam between different ASNs and/or different core networks. The MIP-HA 244 may provide the WTRUs 202a, 202b, 202c with access to packet-switched networks, such as the Internet 210, to facilitate communications between the WTRUs 202a, 202b, 202c and IP-enabled devices. The AAA server 246 may be responsible for user authentication and for supporting user services. The gateway 248 may facilitate interworking with other networks. For example, the gateway 248 may provide the WTRUs 202a, 202b, 202c with access to circuit-switched networks, such as the PSTN 208, to facilitate communications between the WTRUs 202a, 202b, 202c and traditional land-line communications devices. In addition, the gateway 248 may provide the WTRUs 202a, 202b, 202c with access to the networks 212, which may include other wired or wireless networks that are owned and/or operated by other service providers.

Although not shown in FIG. 2C, it will be appreciated that the RAN 204 may be connected to other ASNs and the core network 206 may be connected to other core networks. The communication link between the RAN 204 the other ASNs may be defined as an R4 reference point, which may include protocols for coordinating the mobility of the WTRUs 202a, 202b, 202c between the RAN 204 and the other ASNs. The communication link between the core network 206 and the other core networks may be defined as an R5 reference, which may include protocols for facilitating interworking between home core networks and visited core networks.

Other network 212 may further be connected to an IEEE 802.11 based wireless local area network (WLAN) 260. The WLAN 260 may include an access router 265. The access router may contain gateway functionality. The access router 265 may be in communication with a plurality of access points (APs) 270a, 270b. The communication between access router 265 and APs 270a, 270b may be via wired Ethernet (IEEE 802.3 standards), or any type of wireless communication protocol. AP 270a is in wireless communication over an air interface with WTRU 202d.

It is desirable to improve passive scanning mechanisms to facilitate FILS and/or to reduce the airtime occupancy of MAC frames used for scanning. The AP may transmit a MAC frame, referred to herein as a "FILS Discovery (FD) frame," between full beacon instances to support a quick AP/network discovery for a fast initial link setup. The FD frame may be transmitted periodically and/or non-periodically. If transmitted periodically, the periodicity of the FD frame may be changed. The FD frame is a public action frame, which may be one of the following: a modified measurement pilot frame, a modified short beacon frame, or a newly designed MAC public action frame.

FD frames may be transmitted as non-HT duplicate physical layer convergence procedure (PLOP) protocol data units (PPDUs) at 20 MHz of the 20, 40, 80, and 160 MHz (given the dynamic frequency selection (DFS) ownership of the transmitter) at the 5 GHz band. The FD frame may include the following information items: SSID, capability, access network options, security, AP configuration change count (CCC), AP's next target beacon transmission time (TBTT), and neighbor AP's next TBTT.

One approach to improve the performance of passive scanning is for the STA to acquire the AP/network information without sending a probe request frame. Examples include using a measurement pilot (MP) frame or a short beacon frame.

The MP frame is a compact public action frame transmitted pseudo-periodically by an AP at a shorter interval relative to the beacon interval. The MP frame provides less information than the beacon frame to allow for the required short interval. The MP frame is used to assist the STA with rapid discovery of the existence of a BSS via passive scanning, to allow the STA to rapidly collect neighbor AP signal strength measurements via passive scanning, and to enable the STA to transmit a probe request.

Figure 3:
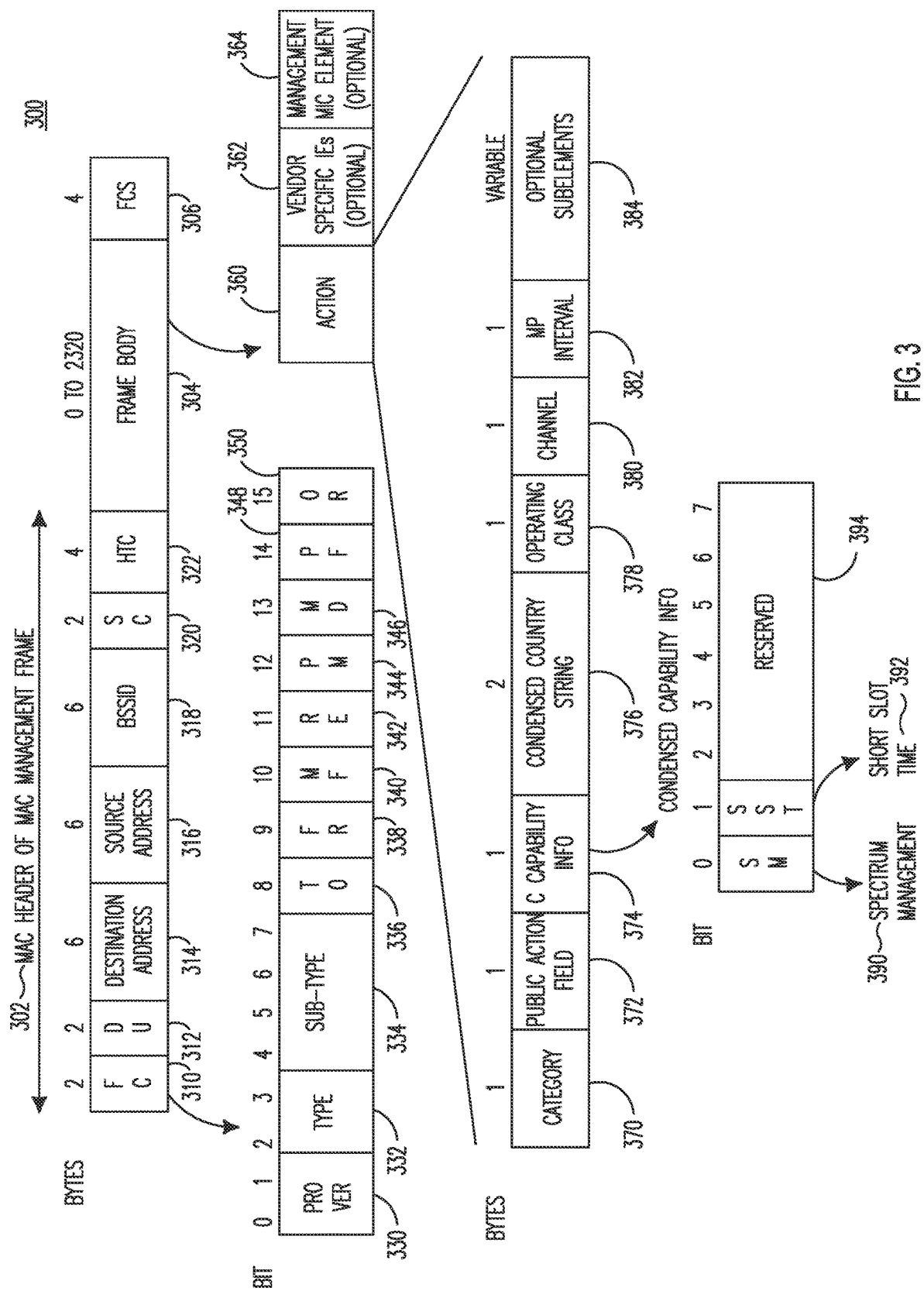
FIG. 3 is a diagram of a measurement pilot frame format.

Configuration parameters for a MP frame include the level of support for the MP and the MP frame interval. FIG. 3 shows an example format of a MP frame 300, which includes a MAC header 302, a frame body 304, and a FCS field 306. The MAC header 302 includes a frame control field 310, a duration field 312, a destination address field 314, a source address field 316, a BSSID field 318, a sequence control field 320, and a HT control field 322.

The frame control field 310 includes a protocol version subfield 330, a type subfield 332, a subtype subfield 334, a to distribution system (DS) subfield 336, a from DS subfield 338, a more fragments subfield 340, a retry subfield 342, a power management subfield 344, a more data subfield 346, a protected frame subfield 348, and an order subfield 350.

The frame body 304 includes an action frame portion 360, one or more vendor-specific IEs 362, and an optional management message integrity code (MIC) element 364. The action frame portion 360 includes a category field 370, a public action field 372, a capability information field 374, a condensed country string field 376, an operating class field 378, a channel field 380, a MP interval field 382, and one or more optional sub-elements 384. The capability information field 374 includes a spectrum management subfield 390, a short slot time subfield 392, and reserved subfields 394.

The MP frame is broadcast by the AP, and the transmission is pseudo-random. The basic MP interval is smaller than a beacon interval. At each target measurement pilot transmission time (TMPTT) meeting the minimum gap from a TBTT, the AP schedules a MP frame as the next frame for transmission, ahead of other queued frames using the access category-voice (AC_VO) enhanced distributed channel access (EDCA) parameters. The minimum gap between the TMPTT and the TBTT is one half of the MP interval. At the TMPTT, if the medium is not available for the AP to transmit a MP frame, the AP defers the MP transmission for a maximum period of one MP interval, and drops the delayed MP frame transmission at the next TMPTT.

While the MP frame may serve as a FD frame, it is unsuitable because more capability information needs to be carried in the FD frame than exists in the current MP frame design. This additional capability information may include, for example: time pointer fields to point to a full/regular TBTT; all the essential information for link setup, so that the scanning STA does not need to wait for a regular beacon or a probe request/response; information on neighbor BSSs, enabling the discovery of neighbor BSS operating parameters; and information of the FILS beacon transmission time of other BSSs.

A short beacon frame is designed to reduce medium occupancy of the beacon transmissions, particularly in systems with small channel bandwidths, for example, 1 MHz, 2 MHz, etc., thus resulting in reduced power consumption (reduced AP transmission time and reduced STA reception time). The short beacon frame is intended to allow a long beacon interval, for example, 500 ms (five times longer than the commonly used 100 ms beacon interval), but still achieve a quick synchronization for the STAs that are in a long sleep period and may wake up at a random time, for example, meters/sensors in machine-to-machine applications.

For the same overhead of a full beacon, the short beacon frame format allows beacons to be transmitted more often, improving synchronization time for asynchronous STAs that wake up at a random time and may synchronize quickly. The short beacon frame carries only essential information for the primary functions of a beacon, including: advertising the presence of the AP; synchronization of the STAs; sharing the minimal information required to allow the STA to transmit; and power saving indications, such as a traffic indication map (TIM). Other non-essential information may be retrieved during the association process, from a full beacon, or using the probe request/response mechanism.

Figure 4:
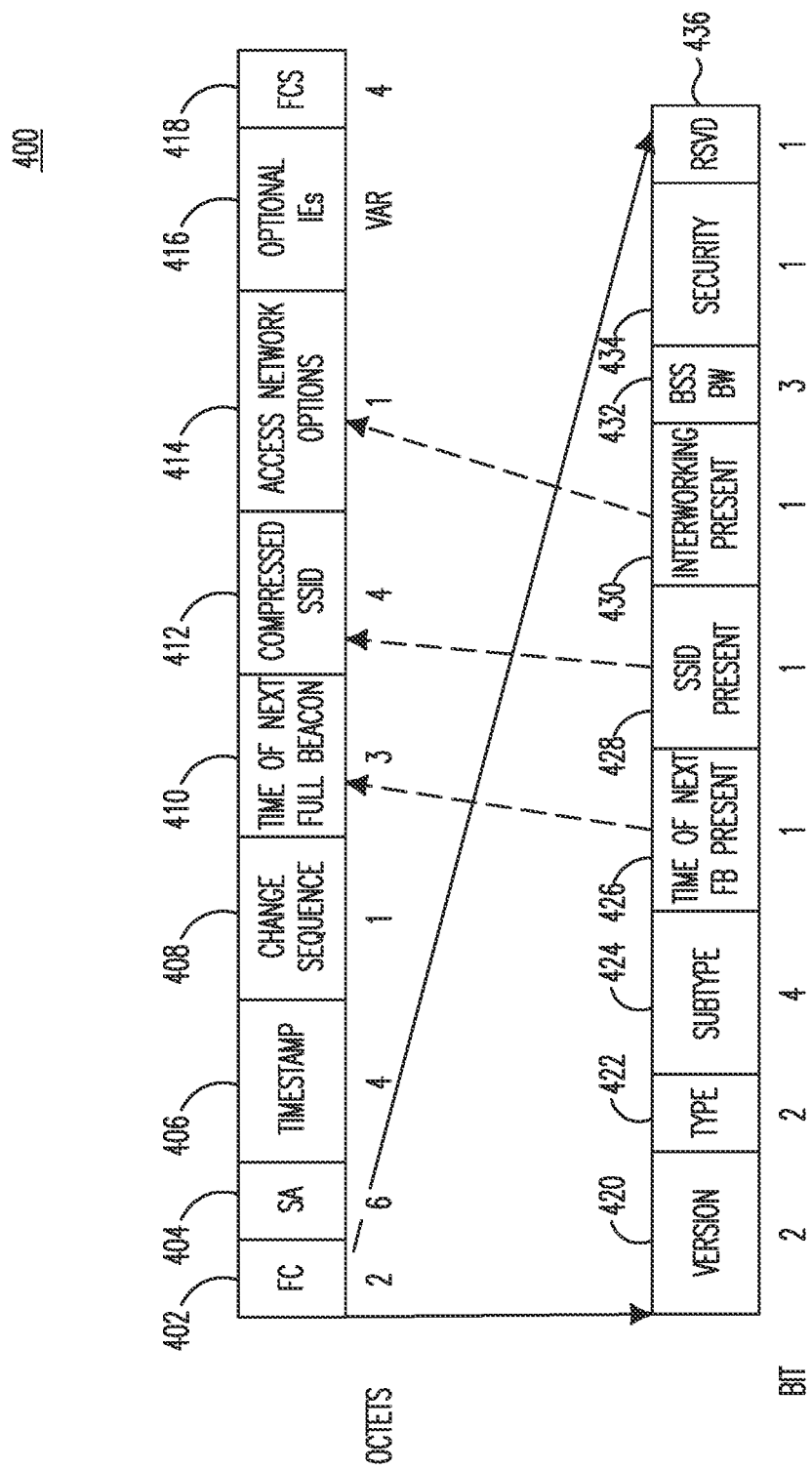
FIG. 4 is a diagram of a short beacon frame format.

FIG. 4 shows an example short beacon frame 400 format, including a frame control field 402, a source address (SA) field 404, a timestamp field 406, a change sequence field 408, a time of next full beacon field 410, a compressed SSID field 412, an access network options field 414, one or more optional IEs 416, and a FCS field 418.

The frame control field 402 includes a version subfield 420, a type subfield 422, a subtype subfield 424, a time of next full beacon present subfield 426, a SSID present subfield 428, an interworking present subfield 430, a BSS bandwidth subfield 432, a security subfield 434, and a reserved subfield 436. The subfields 426-430 are used to indicate whether the corresponding field 410-414 (as shown by the dashed arrows in FIG. 4) is present in the short beacon frame 400.

The requirements of the short beacon frame include a minimum frame size of 17 bytes, with the following information fields: BSS bandwidth, SA, timestamp, and change sequence value. The short beacon frame may also include optional information fields, such as three-bit indicators for the frame control (FC) field to indicate the time of the next full beacon, compressed SSID, and access network options; and optional IEs with variable sizes.

The short beacon frame format may not be suitable for use with the FD frame, because the use cases under which the short beacon frame was designed are different from the FD frame use cases. The short beacon frame use cases include both non-associated STAs (for example, meters and sensors with long sleep cycles) and associated STAs, and do not have to support legacy STAs. Very high wireless medium occupancy may be expected due to lower transmission rates (as low as 100 kbps) with smaller channel sizes and a longer beacon interval. Furthermore, the FD frame use cases include primarily non-associated STAs, require compatibility with legacy STAs, and work with more conventional channel sizes. In addition, the different use cases support different frame contents. With the short beacon frame, it is important to include "change sequence" information and it requires TIMs for associated STAs, but the FD frame use cases do not require a "change sequence" value or support for a TIM.

The current MAC frame format presents a challenge in designing the FILS Discovery (FD) frame, because of the goals of minimizing the FD frame size and allowing legacy non-AP STAs to coexist with FILS-capable non-AP STAs in FILS-capable AP based WLAN systems.

One of the FD frame design goals is to reduce wireless medium occupancy, which requires the FD frame have a small size, preferably smaller than the beacon frame. For example, based on a WLAN system traffic measurement study, the typical beacon frame body size is about 130 bytes, thus the FD frame body is desired to be less than 50 bytes. This imposes two design challenges: identify the necessary information for each content item in the FD frame and efficiently support variable length information items and optional information items in the FD frame.

Currently, the information element (IE) is the most commonly used format to encode variable length information items and optional information items. There is a two-byte overhead for each IE: an element ID field (one byte) and a length field (one byte). The IE also includes an information body field whose size is specified by the length field. With the FILS Discovery mandatory and optional content items, seven IEs are needed (14 bytes of encoding overhead), including the SSID (a variable length information item) and six other optional information items. Therefore, alternative encoding schemes are needed in the FD frame to support variable length information items and optional information items.

The following information may be included in the FD frame to facilitate fast AP/network selection: time to next TBTT, capabilities information, BSS load information, security information, access network options, and neighbor AP information.

The TBTT information is currently provided as a time value based on a common clock synchronized between the AP and the STA. For example, the next TBTT may be derived from two parameters in the regular beacon frame: an eight byte timestamp and a two byte beacon interval field. The timestamp information necessary for the next TBTT is provided by a three-byte Next TBTT Time information field, using the three least significant bytes of the AP's timestamp. Synchronization is needed between the AP and the STA for the STA to correctly interpret the next TBTT time information, when a time value based on the common synchronized clock is used. Because the FD frame is intended to be the first frame received by a STA during initial link setup, the timestamp-based parameter is not applicable to indicate the next TBTT information in the FD frame. Alternative method(s) are required to address these shortcomings.

An indication of the time to the next TBTT indicates the arrival time of the next regular full beacon frame from the transmitting AP of the current FD frame. The indication uses one byte, in a number of time units (TUs), i.e., 1024 μs. The offset value is referenced from the current FD frame transmission time.

The capabilities information assists the STA in fast AP/network discovery and includes, but is not limited to, PHY capability indications, for example, a short preamble or a packet binary convolutional code (PBCC); security capability indications; an ESS indicator; a short time slot; spectrum management information; and an IP4/IPv6 indication.

Most of the existing BSS load information may not be required by a BSS. Therefore, a simple indication of the AP/BSS load may be used. For example, the current load of the AP/BSS may be compressed into a field as short as one byte long and includes channel utilization, average access delay, and/or other measures that accurately reflect the current AP load. One or two parameters may be sufficient to signal the BSS load. In one implementation, a one byte field for either the average access delay or the channel utilization may be used. In another implementation, a one byte field for both the average access delay and the channel utilization may be used, with five bits used for the average access delay and three bits used for the channel utilization.

The security information may include a robust security network element (RSNE), which may be represented by two to four octets, and a privacy capability indication.

Other security information considerations may be addressed by including additional FILS fields. For example, the AP may advertise that it supports optimized FILS authentication procedures, such as FILS Extensible Authentication Protocol (EAP) and/or FILS non-EAP authentication. The AP's support of FILS authentication procedures may be flagged using bits in the RSNE capabilities field. In such a case, an additional field may be added to the RSNE to carry the additional attributes of the specific FILS authentication procedure (for example, FILS identity, cryptographic suites, etc.).

Figure 5:
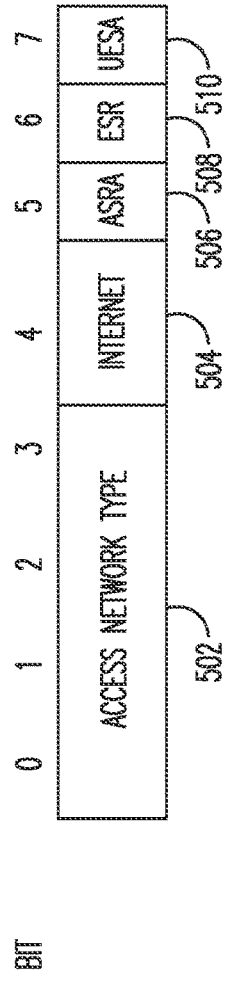
FIG. 5 is a diagram of an access network options information element format for use in a FD frame.

The access network options indicate access services provided by the AP/network (including the access network type). FIG. 5 shows an access network options (ANO) IE 500 format that may be used to signal this information in the FD frame. The access network options IE 500 includes an access network type field 502, an Internet field 504, an additional step required for access (ASRA) field 506, an emergency services reachable (ESR) field 508, and an unauthenticated emergency service accessible (UESA) field 510.

A neighbor AP is currently identified using its BSSID (six bytes) or SSID (typically six to eight bytes, but could be as large as 32 bytes). When there are multiple neighbor APs, the neighbor AP information items need to be organized in the FD frame such that the effectiveness of including the neighbor AP information in the FD frame may be achieved with the minimum necessary information included.

Figure 6:
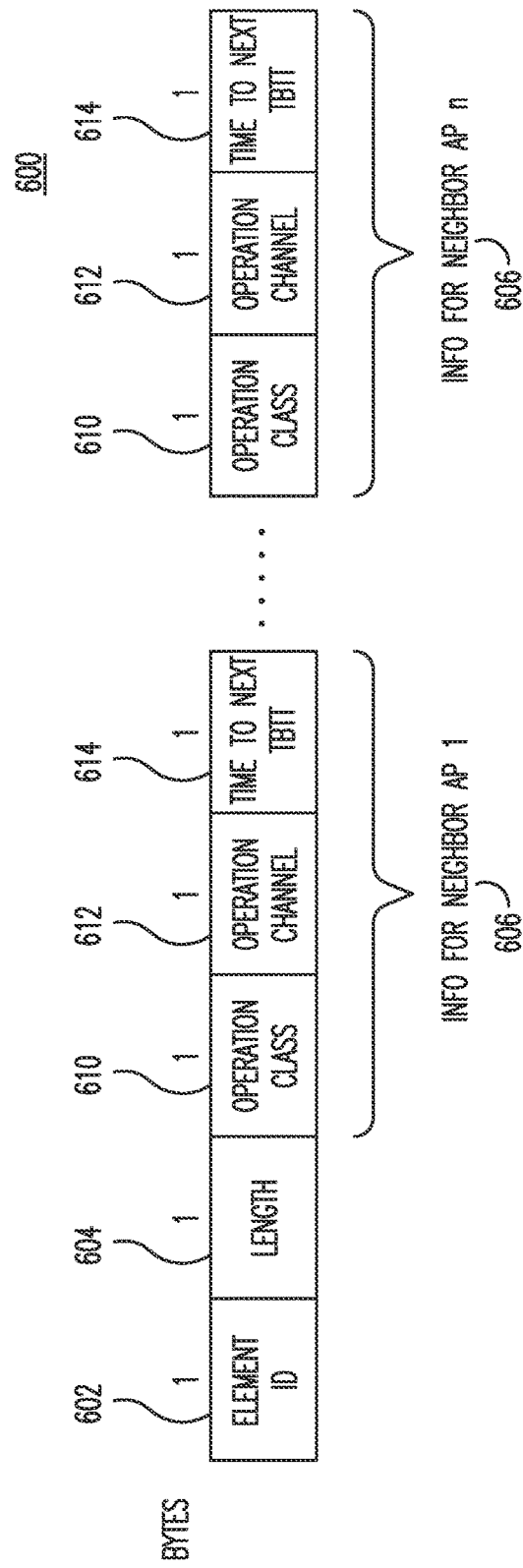
FIG. 6 is a diagram of a neighbor AP information element format for use in a FD frame.

The neighbor AP information provides information about neighbor APs/channels, and includes the channel class, the channel number, the next TBTT, and possibly the BSSID or the SSID. FIG. 6 shows an example of a neighbor AP IE 600 for use in the FD frame. The neighbor AP IE 600 includes an element ID field 602, a length field 604, and information for each neighbor AP 606. The information for a neighbor AP 606 includes an operation class field 610, an operation channel field 612, and a time to next TBTT field 614.

The following information may be included in the FD frame to advertise the presence of an AP: BSSID, compressed SSID, and channel descriptors. The BSSID uniquely identifies each BSS and is a six byte MAC address of the AP for an infrastructure BSS. The information in the BSSID may be carried in the SA (source address) field or the Address-3 field in the MAC header of the FD frame.

The compressed SSID includes the identity of an extended service set (ESS) or an independent basic service set (IBSS). A device that knows the full SSID may discover the presence of the BSS by decoding the compressed SSID. A standardized hashing function may be performed on the SSID to create the compressed SSID. In one implementation, the compressed SSID field is four bytes long.

The channel descriptors include the channel frequency and spacing for the operating channel, specified by country, operation class, and operation channel. The country string identifies the country in which the STA is operating, and a condensed country string (for example, the first two bytes in the country string) may be used for the FD frame. The operation class identifies the operation class for the operation channel. The operation channel identifies the operation channel within the operation class.

The shortened timestamp used for the short beacon frame (the four least significant bytes of the timestamp at the AP) may be reused for the FD frame.

Figure 7:
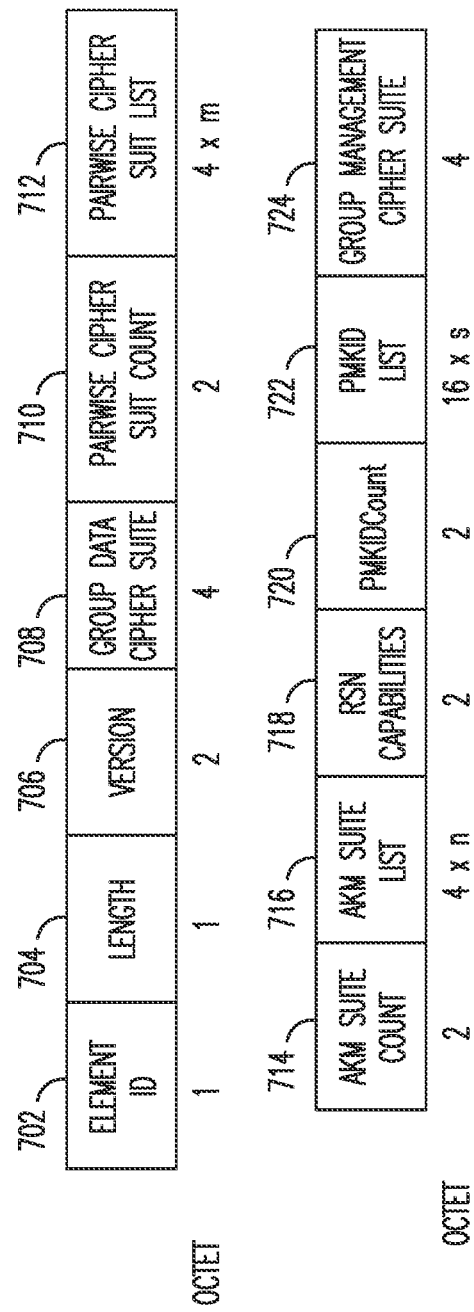
FIG. 7 is a diagram of a robust security network element (RSNE) for use in a FD frame.

Several versions of optimizing the robust security network element (RSNE) are described in FIGS. 7-12. FIG. 7 shows an RSNE 700 format, including an element ID field 702; a length field 704; a version field 706; a group data cipher suite field 708; a pairwise cipher suite count field 710; a pairwise cipher suite list field 712, where m denotes the pairwise cipher suite count; an authentication and key management (AKM) suite count field 714; an AKM suite list field 716, where n denotes the AKM suite count; a RSN capabilities field 718; a pairwise master key (PMK) identifier (PMKID) count field 720; a PMKID list field 722, where s denotes the PMKID count; and a group management cipher suite field 724. The RSNE may be up to 255 octets in length, and RSNE optimization is required for it to be included into the FD frame.

Figure 8:
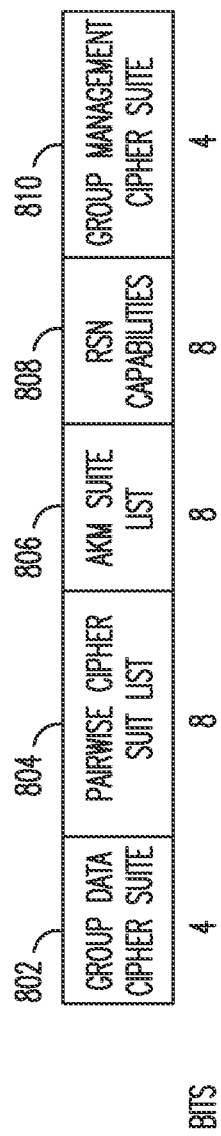
FIG. 8 is a diagram of a fixed-length optimized RSNE for use in a FD frame.

FIG. 8 shows an optimized RSNE 800 for use in the FD frame using a fixed-length four octet coding. The RSNE 800 includes a group data cipher suite field 802, which may be four bits long; a pairwise cipher suite list field 804, which may be eight bits long, allowing up to two pairwise suites; an AKM suite list field 806, which may be eight bits long, allowing up to two AKM suites; an optimized RSN capabilities field 808, which may be eight bits long; and a group management cipher suite field 810, which may be four bits long. The RSN capabilities field 808 may include a one bit pre-authentication subfield and a one bit management frames protection required subfield. The remaining six bits of the RSN capabilities field 808 may carry other information, including flags for AP support of FILS authentication procedures; for example, a one bit FILS EAP authentication field and a one bit FILS non-EAP authentication field.

Figure 9:
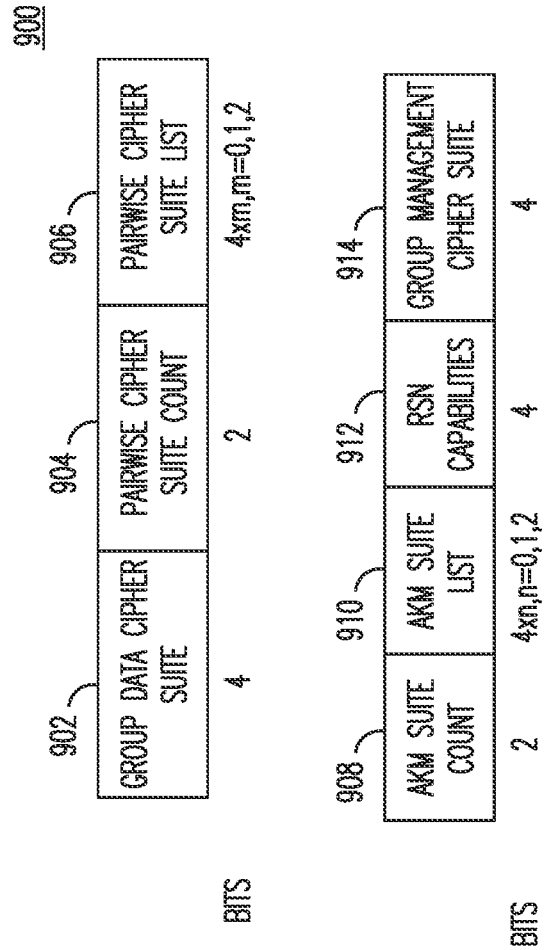
FIG. 9 is a diagram of a variable-length optimized RSNE for use in a FD frame.

FIG. 9 shows an optimized RSNE 900 for use in the FD frame using a variable-length coding of up to four octets. The RSNE 900 includes a group data cipher suite field 902, which may be four bits long; a pairwise cipher suite count field 904, which may be two bits long; a pairwise cipher suite list field 906, which may be zero, four, or eight bits long, depending on the value of the pairwise cipher suite count field 904; an AKM suite count field 908, which may be two bits long; an AKM suite list field 910, which may be zero, four, or eight bits long, depending on the value of the AKM suite count field 908; an optimized RSN capabilities field 912, which may be four bits long; and a group management suite field, which may be four bits long. The RSN capabilities field 912 may include a one bit pre-authentication subfield, a one bit management frames protection required subfield, a one bit FILS EAP authentication subfield, and a one bit FILS non-EAP authentication subfield.

Figure 10:
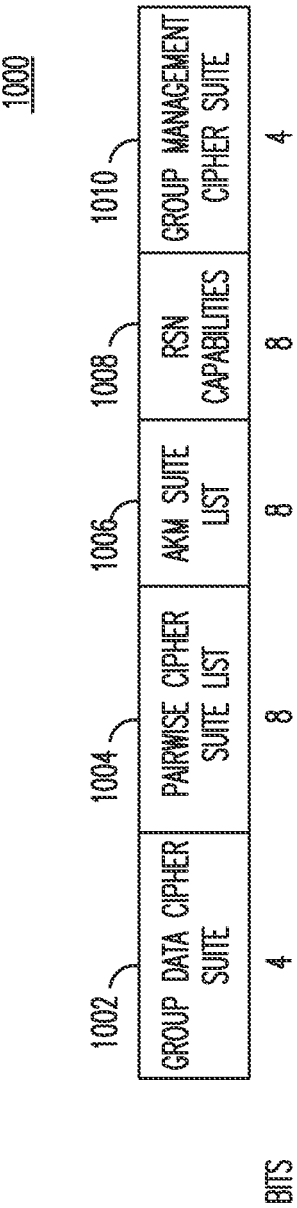
FIG. 10 is a diagram of a fixed-length bit-map coding for an optimized RSNE for use in a FD frame.

FIG. 10 shows an optimized RSNE 1000 for use in the FD frame using a fixed-length bit map coding of four octets. The RSNE 1000 includes a group data cipher suite field 1002, which may be four bits long; a pairwise cipher suite list field 1004, which may be eight bits long, allowing up to eight pairwise suite selections; an AKM suite list field 1006, which may be eight bits long, allowing up to eight AKM suite selections; an optimized RSN capabilities field 1008, which may be eight bits long; and a group management suite field, which may be four bits long. The RSN capabilities field 1008 may include a one bit pre-authentication subfield and a one bit management frames protection required subfield. The remaining six bits of the RSN capabilities field 1008 may carry other information, reflecting AP support of FILS authentication procedures.

Figure 11:
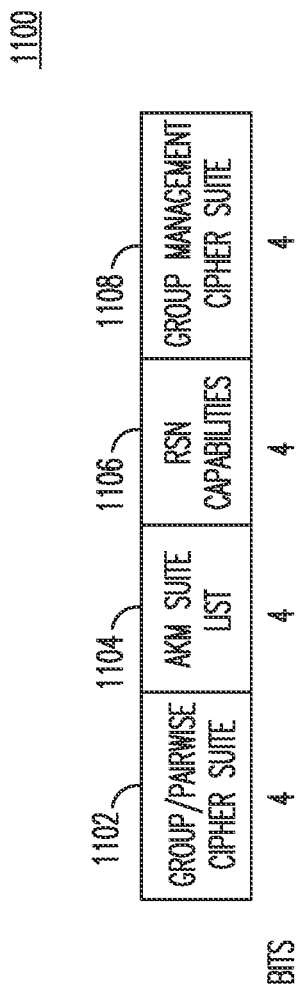
FIG. 11 is a diagram of a fixed-length two octet optimized RSNE for use in a FD frame.

FIG. 11 shows an optimized RSNE 1100 for use in the FD frame using a fixed-length two octet coding. The RSNE 1100 includes a combined group and pairwise cipher suite field 1102, which may be four bits long; an AKM suite list field 1104, which may be four bits long; an optimized RSN capabilities field 1106, which may be four bits long; and a group management suite field 1108, which may be four bits long. The pairwise cipher suite field 1102 represents the cipher suite selected to be used to protect both group data and pairwise data. The RSN capabilities field 1106 may include a one bit pre-authentication subfield, a one bit management frames protection required subfield, a one bit FILS EAP authentication subfield, and a one bit FILS non-EAP authentication subfield.

Figure 12:
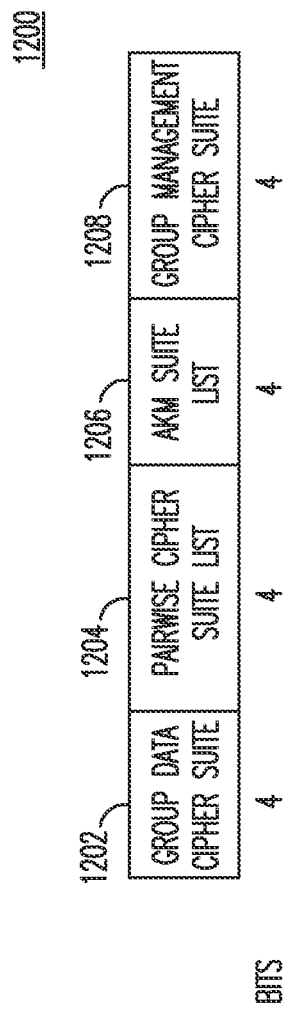
FIG. 12 is a diagram of a two octet optimized RSNE with a RSN capabilities field for use in a FD frame.

FIG. 12 shows an alternative optimized RSNE 1200 for use in the FD frame using a fixed-length two octet coding. The RSNE 1200 includes a group cipher suite field 1202, which may be four bits long; a pairwise cipher suite list field 1204, which may be four bits long; an AKM suite list field 1206, which may be four bits long; and a group management cipher suite field 1208, which may be four bits long. In the RSNE 1200, the RSN capabilities field is not included in the FD frame.

In the RSNEs 700-1200, the cipher suites may be represented by four bits as shown in Table 1.

TABLE 1

| Four bit representation of cipher suite | OUI (organizationally unique identifier) | Suite type | Meaning |
| --- | --- | --- | --- |
| 0000 | 00-0F-AC | 0 | Use group cipher suite |
| 0001 | 00-0F-AC | 1 | WEP-40 |
| 0010 | 00-0F-AC | 2 | TKIP |
| 0011 | 00-0F-AC | 3 | Reserved |
| 0100 | 00-0F-AC | 4 | CCMP - default pairwise cipher suite and default group cipher suite for data frames in an RSNA |

TABLE 1-continued

| Four bit representation of cipher suite | OUI (organizationally unique identifier) | Suite type | Meaning |
|---|---|---|---|
| 0101 | 00-0F-AC | 5 | WEP-104 |
| 0110 | 00-0F-AC | 6 | BIP - default group management cipher suite in an RSNA with management frame protection enabled |
| 0111 | 00-0F-AC | 7 | Group address traffic not allowed |
|  | 00-0F-AC | 8-255 | Reserved |
|  | Vendor OUI | Other | Vendor-specific |
|  | Other | Any | Reserved |

In the RSNEs 700-1200, the AKM suites may be represented by four bits as shown in Table 2.

TABLE 2

| AKM suite list bits | OUI | Suite type | Meaning |||
|---|---|---|---|---|---|
| | | | Authentication type | Key management type | Key derivation type |
| 0000 | 00-0F-AC | 0 | Reserved | Reserved | Reserved |
| 0001 | 00-0F-AC | 1 | Authentication negotiated over IEEE802.1X or using PMKSA caching as defined in 11.5.9.3 - RSNA default | RSNA key management as defined in 11.6 or using PMKSA caching as defined in 11.59.3 - RSNA default | Defined in 11.6.1.2 |
| 0010 | 00-0F-AC | 2 | PSK | RSNA key management as defined in 11.6, using PSK | Defined in 11.6.1.2 |
| 0011 | 00-0F-AC | 3 | FT authentication negotiated over IEEE 802.1X | FT key management as defined in 11.6.1.7 | Defined in 11.6.1.7.2 |
| 0100 | 00-0F-AC | 4 | FT authentication using PSK | FT key management as defined in 11.6.1.7 | Defined in 11.6.1.7.2 |
| 0101 | 00-0F-AC | 5 | Authentication negotiated over IEEE 802.1X or using PMKSA caching as defined in 11.5.9.3 with SHA256 Key Derivation | RSNA Key Management as defined in 8.5 or using PMKSA caching as defined in 11.5.9.3, with SHA256 Key Derivation | Defined in 11.6.1.7.2 |
| 0110 | 00-0F-AC | 6 | PSK with SHA256 Key Derivation | RSNA Key Management as defined in 11.6 using PSK with SHA256 Key Derivation | Defined in 11.6.1.7.2 |
| 0111 | 00-0F-AC | 7 | TDLS | TPK Handshake | Defined in 11.6.1.7.2 |
| 1000 | 00-0F-AC | 8 | SAE Authentication with SHA-256 or using PMKSA caching as defined in 11.5.9.3 with SHA-256 key derivation | RSNA key management as defined in 11.6, PMKSA caching as defined in 11.5.9.3 with SHA256 key derivation or authenticated mesh peering exchange as defined in 13.5 | Defined in 11.6.1.7.2 |
| 1001 | 00-0F-AC | 9 | FT authentication over SAE with SHA-256 | FT key management defined in 11.6.1.7 | Defined in 11.6.1.7.2 |
| | 00-0F-AC | 10-255 | Reserved | Reserved | Reserved |
| | Vendor OUI | Any | Vendor-specific | Vendor-specific | Vendor-specific |
| | Other | Any | Reserved | Reserved | Reserved |

The following information may be included in the FD frame to enable the STA to transmit, including PHY specific information and power constraints. The PHY specific information includes 802.11g, 802.11n, and 802.11ac PHY-specific information. The 802.11g PHY-specific information includes three bits (NonERP_Present, Use_Protection, and Barker_Preamble_Mode) from the extended rate PHY (ERP) IE. The five reserved bits may be used to signal other information in the capabilities field.

The 802.11n PHY-specific information may include a shortened HT capabilities element which may be compressed into a one byte information body as shown in Table 3.

TABLE 3

| HT Capabilities Item | Size (bits) |
|---|---|
| Supported Channel Width Set | 1 |
| HT-Greenfield | 1 |
| Transmit STBC | 1 |
| Receive STBC | 2 |
| Reserved | 2 |
| 40 MHz Intolerant | 1 |

The 802.11n PHY-specific information may also include a shortened HT operation element which may be compressed into a one byte information body, using only the primary channel field. Optionally, the one bit STA channel width subfield may be included, and one reserved bit in Table 3 may be reused to save overhead.

Figure 13:
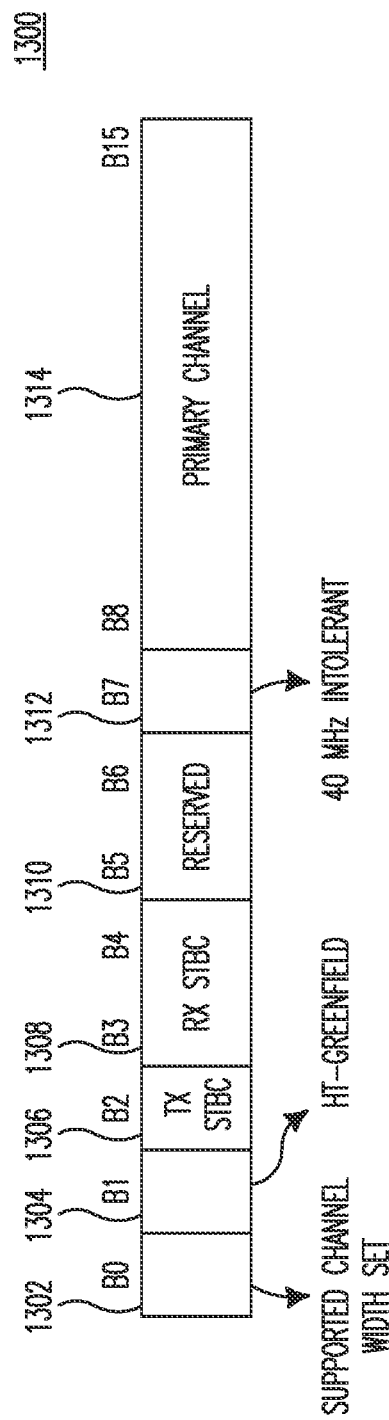
FIG. 13 is a diagram of HT physical layer-specific information element for use in a FD frame.

FIG. 13 shows an example of a HT PHY-specific IE 1300 for use in the FD frame. The HT PHY-specific IE 1300 includes a supported channel width set field 1302, to indicate the channel widths supported by the STA; an HT-Greenfield field 1304, to indicate support for receiving PPDUs with the HT-Greenfield format; a transmit space-time block coding (STBC) field 1306, to indicate support for the transmission of PPDUs using STBC; a receive STBC field 1308, to indicate support for receiving PPDUs using STBC; a reserved portion 1310; a 40 MHz intolerant field 1312, to indicate whether 40 MHz transmissions are prohibited; and a primary channel field 1314, to indicate the primary operating channel.

The 802.11ac PHY-specific information may include a shortened VHT capabilities element which may be compressed into a one byte information body as shown in Table 4.

TABLE 4

| VHT/HT Capabilities and Operation Item | Size (bits) |
| --- | --- |
| Supported Channel Width Set (from VHT Capability Element) | 2 |
| Transmit STBC (from VHT Capability Element) | 1 |
| Receive STBC (from VHT Capability Element) | 3 |
| STA Channel Width (from HV Operation Element) | 1 |
| Reserved | 1 |

The 802.11ac PHY-specific information may also include a shortened VHT operation element, and a HT operation element which may be compressed into a four byte information body.

The BSS operating channel width may be indicated by a combination of the STA channel width subfield in the HT operation element HT operation information field and the channel width subfield in the VHT operation element VHT operation information field. The STA channel width subfield may be packed with other items in the one byte information body as shown in Table 4 above.

The channelization may be indicated by using a combination of the information in the HT operation element primary channel field and the VHT operation element VHT operation information field channel center frequency segment 0 and channel center frequency segment 1 subfields.

Figure 14:
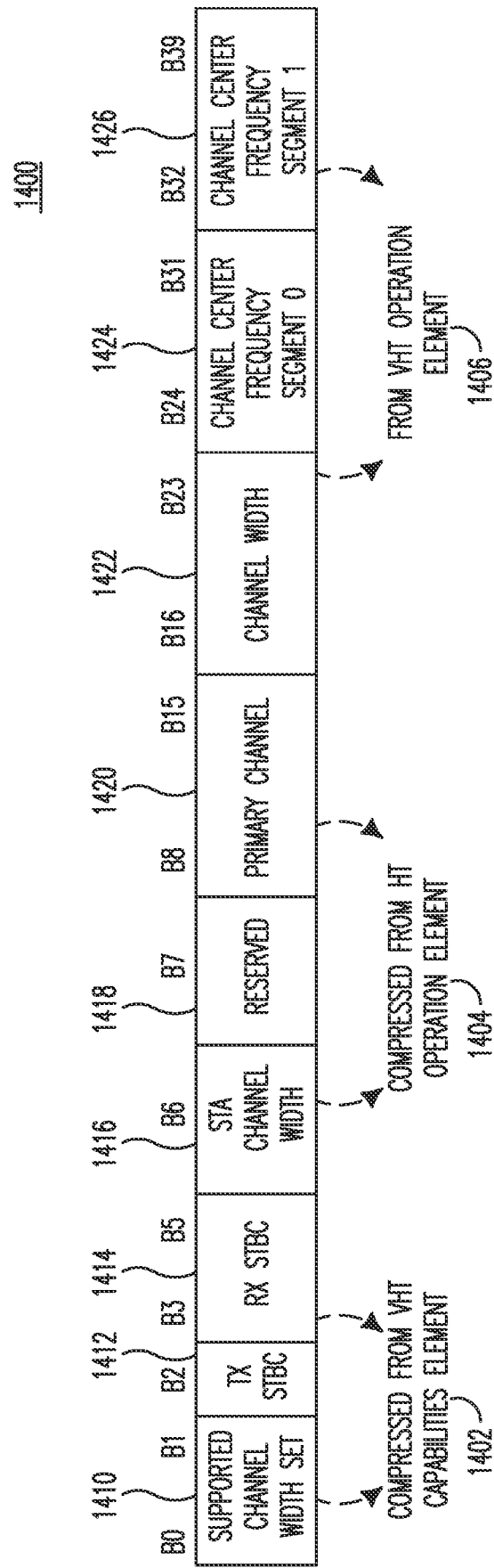
FIG. 14 is a diagram of very high throughput (VHT) physical layer-specific information element for use in a FD frame.

FIG. 14 shows an example of a VHT PHY-specific IE 1400 for use in the FD frame. The VHT PHY-specific IE 1400 includes a first portion 1402 with elements compressed from the VHT capabilities element, a second portion 1404 with elements compressed from the HT operation element, and a third portion 1406 with elements from the VHT operation element. The first portion 1402 includes a supported channel width set field 1410, a transmit STBC field 1412, and a receive STBC field 1414. The second portion 1404 includes a STA channel width field 1416, a reserved portion 1418, and a primary channel field 1420. The third portion 1406 includes a channel width field 1422, a channel center frequency segment 0 field 1424, and a channel center frequency segment 1 field 1426.

The power constraints information includes the information necessary to allow a STA to determine the local maximum transmit power in the current channel. The one byte power constraints IE in the beacon or the probe response frame may be reused to signal this information in the FD frame.

A control field, called the FD frame control field, is introduced into the FD frame to support an efficient encoding of the content items in the FD frame body. FIG. 15 shows an example of a FD frame 1500 including a FD frame header 1502, a FD frame body 1504, and a FCS field 1506. The FD frame header 1502 may include a MAC management frame header and other framing fields, depending on the frame format used. The FD frame body 1504 includes a FD frame control field 1510 and the FD frame contents 1512.

The FD frame control field 1510 may be located in any deterministic place in the FD frame body 1504, as long as the STA receiving the FD frame 1500 can locate the control field unambiguously. In one implementation, the FD frame control field 1510 may be placed as the first information field in the FD frame body 1504.

The FD frame control field 1510 includes one or more control subfield(s), which are used to support the receiving STA in deterministically decoding and interpreting the content items in the FD frame body 1504. Typical examples include indicating the presence of the optional information items in the FD frame body 1504 and accommodating variable-size information items in the FD frame body 1504. In one implementation, the FD frame control field 1510 may include a one bit indicator to indicate whether or not an optional content item is present in a specific FD frame instance. Using the one bit indicator is a more efficient encoding scheme compared to the IE format with its two byte encoding overhead. The FD frame control field 1510 collects all of the needed control information for the content items in the FD frame body 1504 into a single control field, while the IE format distributes the control information into each content item.

The SSID information is required in the FD frame to allow the AP to advertise its presence on the channel and to enable a STA to initiate association. It is noted that the SSID information is the only information that is required to be in the FD frame, and any additional information items included in the FD frame are optional. Currently, the full SSID (which is zero to 32 bytes long) is needed to initiate association. During initial link setup, the SSID information is provided to the STA in the beacon and probe response frames, encoded in the SSID IE.

While the maximum size of the SSID is 32 bytes, in practice, SSIDs usually have a smaller size, for example, typically six to eight bytes. A variable length SSID information item may be supported in the FD frame. A separate control subfield may be included in the FD frame control field to signal the actual size of the SSID in the FD frame instead of using the SSID IE format. To minimize the size of the FD frame, the SSID information item in the FD frame may be sent in a condensed format, for example, compressed, truncated, etc.

Figure 16B:
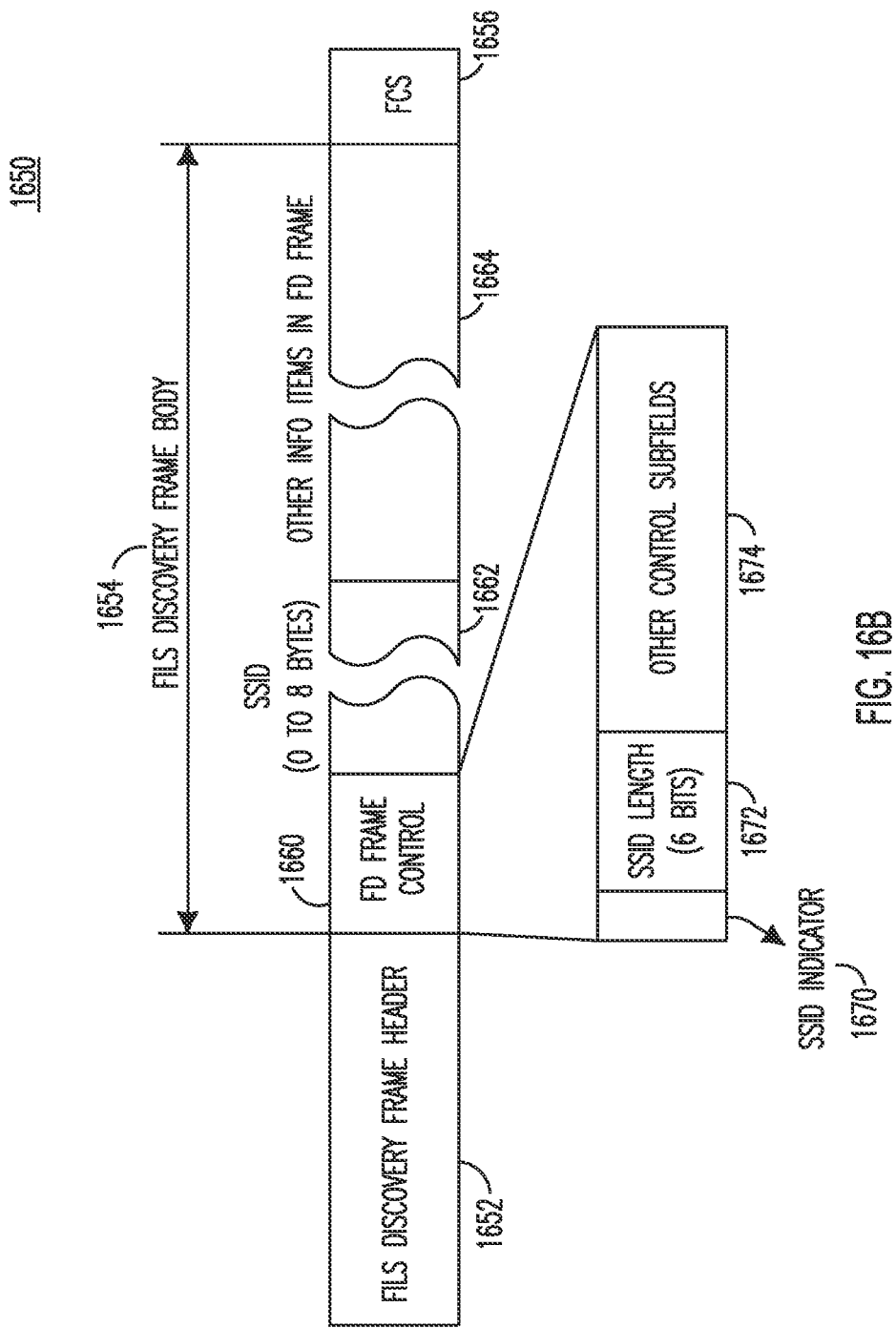

FIGS. 16A-16B show two examples of the SSID information item design for the FD frame. FIG. 16A shows a FD frame 1600 including a FD frame header 1602, a FD frame body 1604, and a FCS field 1606. The FD frame header 1602 may include a MAC management frame header and other framing fields, depending on the frame format used. The FD frame body 1604 includes a FD frame control field 1610, a SSID field 1612, and other information items 1614 for the FD frame. It is noted that the other information items 1614 are optional, and in some embodiments, only the SSID field 1612 may be included in the FD frame body 1604.

The FD frame control field 1610 includes a SSID length field 1620 and other control subfields 1622. The SSID length field 1620 is used to indicate the actual size, in bytes, of the SSID field 1612. In this embodiment, the SSID retains the typical size range, i.e., zero to 32 bytes.

FIG. 16B shows a FD frame 1650 including a FD frame header 1652, a FD frame body 1654, and a FCS field 1656. The FD frame header 1652 may include a MAC management frame header and other framing fields, depending on the frame format used. The FD frame body 1654 includes a FD frame control field 1660, a SSID field 1662, and other information items 1664 for the FD frame. It is noted that the other information items 1664 are optional, and in some embodiments, only the SSID field 1662 may be included in the FD frame body 1654.

The FD frame control field 1660 includes a SSID indicator subfield 1670, a SSID length subfield 1672, and other control subfields 1674. The SSID indicator subfield 1670 is used to indicate if the SSID field 1662 contains a full SSID or a condensed SSID, and may be implemented as a one bit indicator. The SSID length subfield 1672 is used to indicate the length, in bytes, of the SSID field 1662. In this implementation, the SSID is presented in a truncated range, for example, from zero to eight bytes.

Because a full SSID is required for the STA to initiate association, any condensed SSID (which may include a compressed SSID or a truncated SSID, for example) needs to be deterministically mapped back to its full SSID. There are several options to condense or compress the SSID at the transmitter side, and there are several options to map or decompress the SSID at the receiver side. The specific options chosen do not affect the contents of the FD frame 1650.

The capability information item in the FD frame includes the following features. It includes a minimum set of necessary AP/network capability information that is needed for the STA to de-select an AP/network during AP/network discovery in initial link setup. The existing two byte capability field may be modified to be used in this context as starting point, and removes unnecessary subfields for FD frame use. FD frame relevant information items are added, for example, supported minimum rate, PHY type, PHY mode(s), IPv4/IPv6 support, etc. A one bit indicator in the FD frame control field may be used to indicate the presence of the capability information item in the FD frame.

Figure 17:
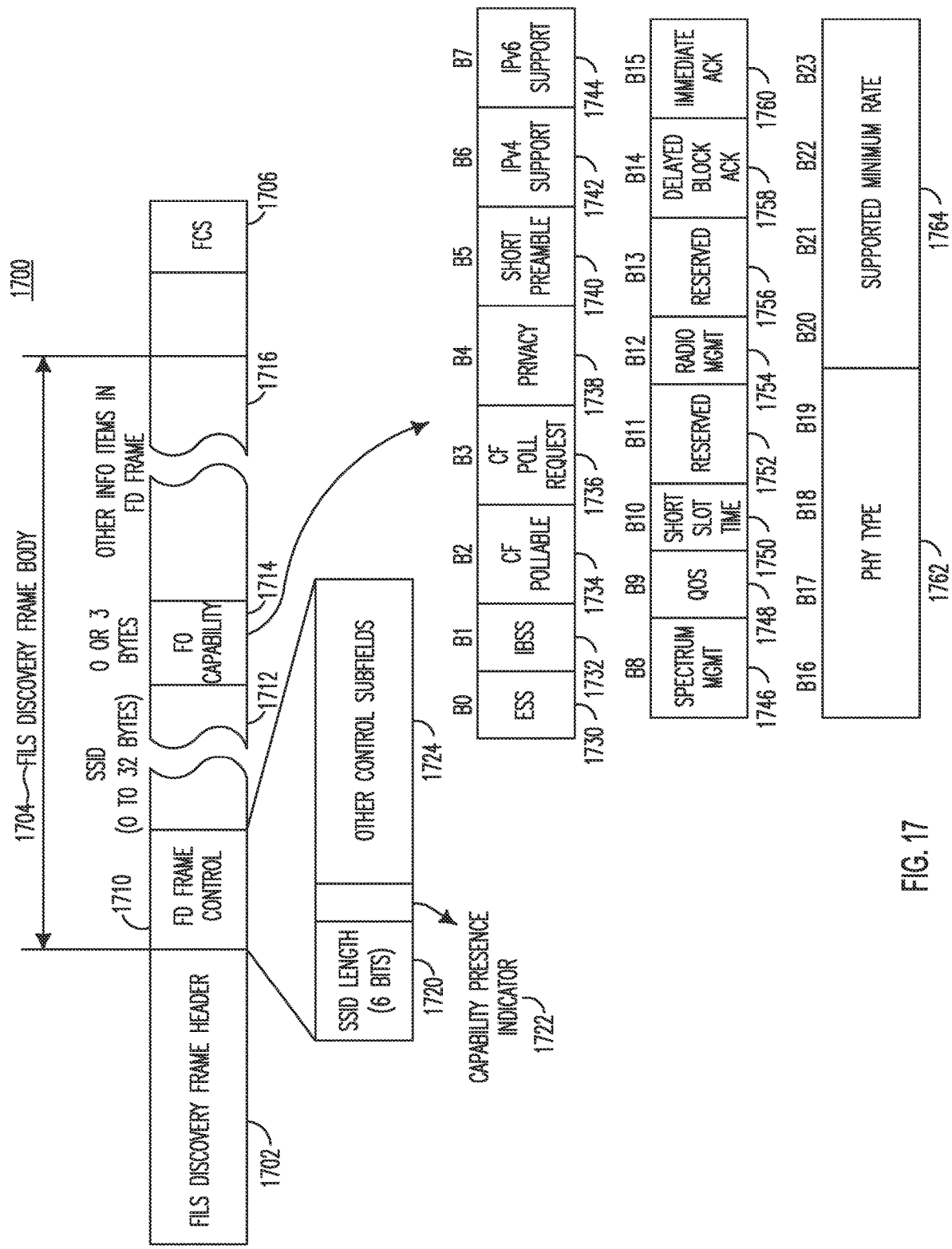
FIG. 17 is a diagram of a FD frame capability information item format.

FIG. 17 shows an example of an FD frame 1700 including a three byte long FD capability information item. The FD frame 1700 includes a FD frame header 1702, a FD frame body 1704, and a FCS field 1706. The FD frame body 1704 includes a FD frame control field 1710, a SSID field 1712, a FD capability field 1714, and other information items 1716. It is noted that the other information items 1716 are optional, and in some embodiments, the other information items 1716 may be omitted from the FD frame body 1704.

The FD frame control field 1710 includes a SSID length subfield 1720; a capability presence indicator field 1722, to indicate whether the FD capability field 1714 is present in the FD frame 1700; and other control subfields 1724.

The FD capability field includes an ESS subfield 1730, an IBSS subfield 1732, a contention free (CF) pollable subfield 1734, a CF-Poll request subfield 1736, a privacy subfield 1738, a short preamble subfield 1740, an Internet Protocol (IP) v4 support subfield 1742, an IPv6 support subfield 1744, a spectrum management subfield 1746, a QoS subfield 1748, a short slot time subfield 1750, a first reserved subfield 1752, a radio management subfield 1754, a second reserved subfield 1756, a delayed block ACK subfield 1758, an immediate ACK subfield 1760, a PHY type subfield 1762, and a supported minimum rate subfield 1764.

Based on the features described above, alternative designs of the FD capability field 1714 may be generated. For example, the supported minimum rate subfield 1764 may be eliminated, assuming that this information may be inferred from the PHY type subfield 1762 as the minimum mandatory rate. In addition, the supported minimum rate subfield 1764 may be encoded as numerical values at pre-defined units, for example, at steps of 0.5 Mbps, 1 Mbps, etc.

The CF pollable subfield 1734 and the CF-Poll request subfield 1736 may not be needed in the FD capability field 1714, because the QoS subfield 1748 may provide sufficient information for the AP/network initial de-selection purposes.

The ACK related capabilities, for example, the delayed block ACK subfield 1758 and the immediate ACK subfield 1760, may be signaled in a later message during link setup instead of in the first AP to STA message, such as the FD frame 1700. This allows the two FD capability bits for the delayed block ACK and the immediate ACK to be "reserved" or used for other capability indications.

In addition, the bits that are currently reserved in the FD capability field 1714 (for example, the first reserved subfield 1752 and the second reserved subfield 1756) may be used in the future to indicate new system capabilities, for example, a new Layer 3 protocol capability.

The FD security information item may have a fixed length or a variable length. A fixed length FD security information item may be four bytes long, although any fixed length may be used. A minimum set of necessary security information is included to allow the STA to de-select the AP/network during AP/network discovery in initial link setup. The existing RSNE may be modified to make it smaller in size. For example, the RSN capabilities subfield may be redesigned to reflect its practical uses and the FD frame-specific considerations. The number of pairwise suites and AKM suites may be limited to, for example, two each. Four bit codes to identify cipher suites and AKM suites may be used. The PMKID count and PMKID list fields may be removed.

The FD security information item may also include security capability indicators for FILS authentication methods support, for example, FILS fast-EAP based authentication, FILS EAP-reauthentication protocol (RP) based authentication, FILS non-EAP fast authentication, and FILS fast authentication without third party. A one bit indicator in the FD frame control field may be used to indicate the presence of the security information item in the FD frame.

Figure 18:
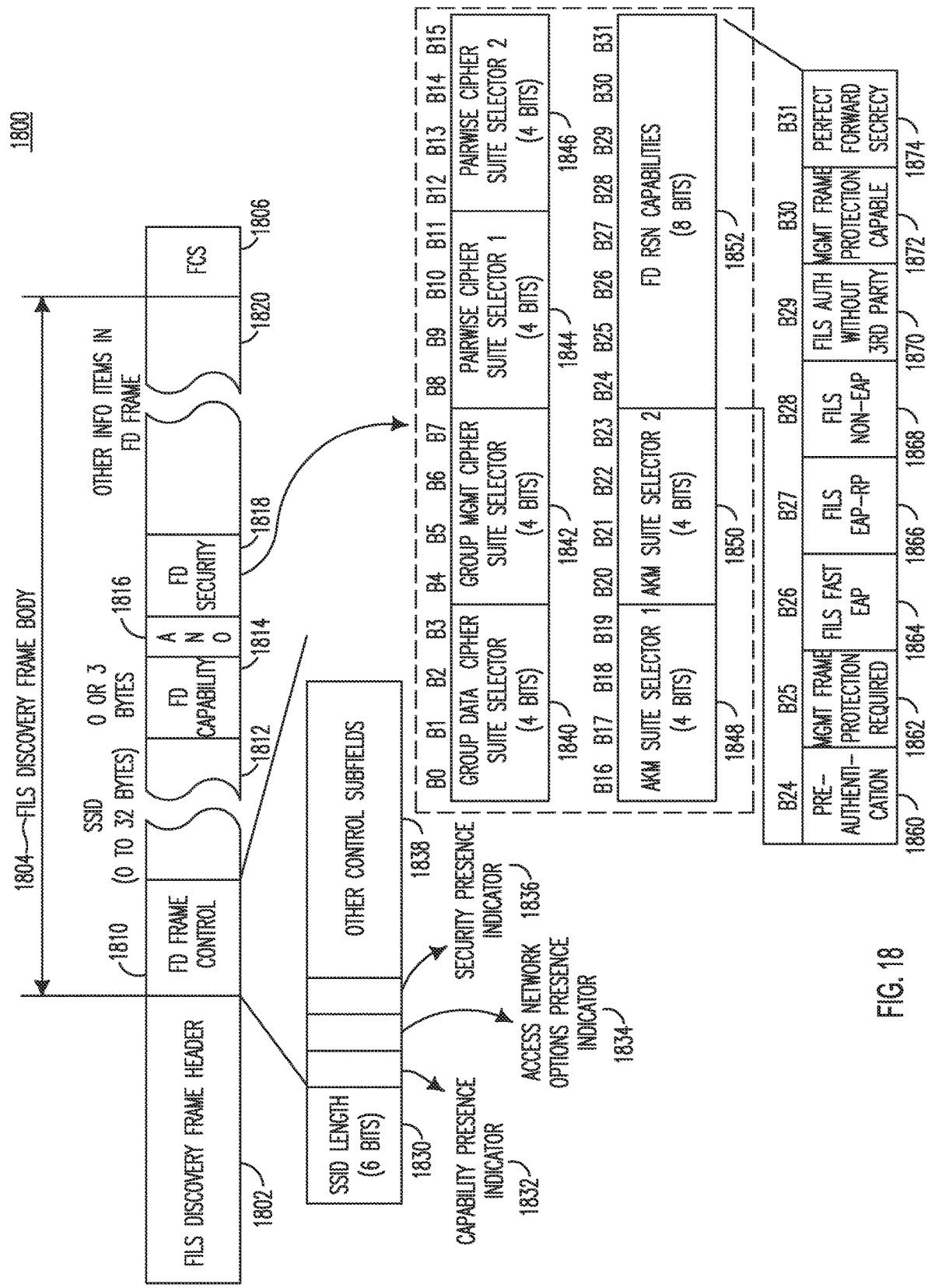
FIG. 18 is a diagram of a FD frame security information item format.

FIG. 18 shows an example of an FD frame 1800 including a four byte FD security information item. The FD frame 1800 includes a FD frame header 1802, a FD frame body 1804, and a FCS field 1806. The FD frame body 1804 includes a FD frame control field 1810, a SSID field 1812, a FD capability field 1814, an access network options (ANO) field 1816, a FD security field 1818, and other information items 1820. It is noted that the other information items 1820 are optional, and in some embodiments, the other information items 1820 may be omitted from the FD frame body 1804.

The FD frame control field 1810 includes a SSID length subfield 1830, a capability presence indicator field 1832, an ANO presence indicator subfield 1834, a security presence indicator subfield 1836, and other control subfields 1838.

The FD security field 1818 includes a group data cipher suite selector subfield 1840, a group management cipher suite selector subfield 1842, a pairwise cipher suite selector 1 subfield 1844, a pairwise cipher suite selector 2 subfield 1846, an AKM suite selector 1 subfield 1848, an AKM suite selector 2 subfield 1850, and a FD RSN capabilities subfield 1852. The FD RSN capabilities subfield 1852 includes a pre-authentication subfield 1860, a management frame protection required subfield 1862, a FILS fast EAP subfield 1864, a FILS EAP-RP subfield 1866, a FILS non-EAP subfield 1868, a FILS authentication without third party subfield 1870, a management frame protection capable subfield 1872, and a perfect forward secrecy subfield 1874.

Based on the features described above, alternative designs of the FD security field 1818 may be generated. For example, if assuming one AKM suite selector provides sufficient information for the AP/network initial de-selection purpose, then the FD security field 1818 may contain one AKM suite selector, instead of two.

A variable length FD security information item includes similar information as the fixed length variant, but with the following changes to reflect its variable length. A variable length security field (RSNE) may be used, and its length may be zero to six octets, for example. The optional RSN capabilities (RSNC) subfield within the RSNE field also has a variable length and may be zero to three octets, for example. The number of pairwise suites and AKM suites may be limited to, for example, up to two each.

Figure 19A:
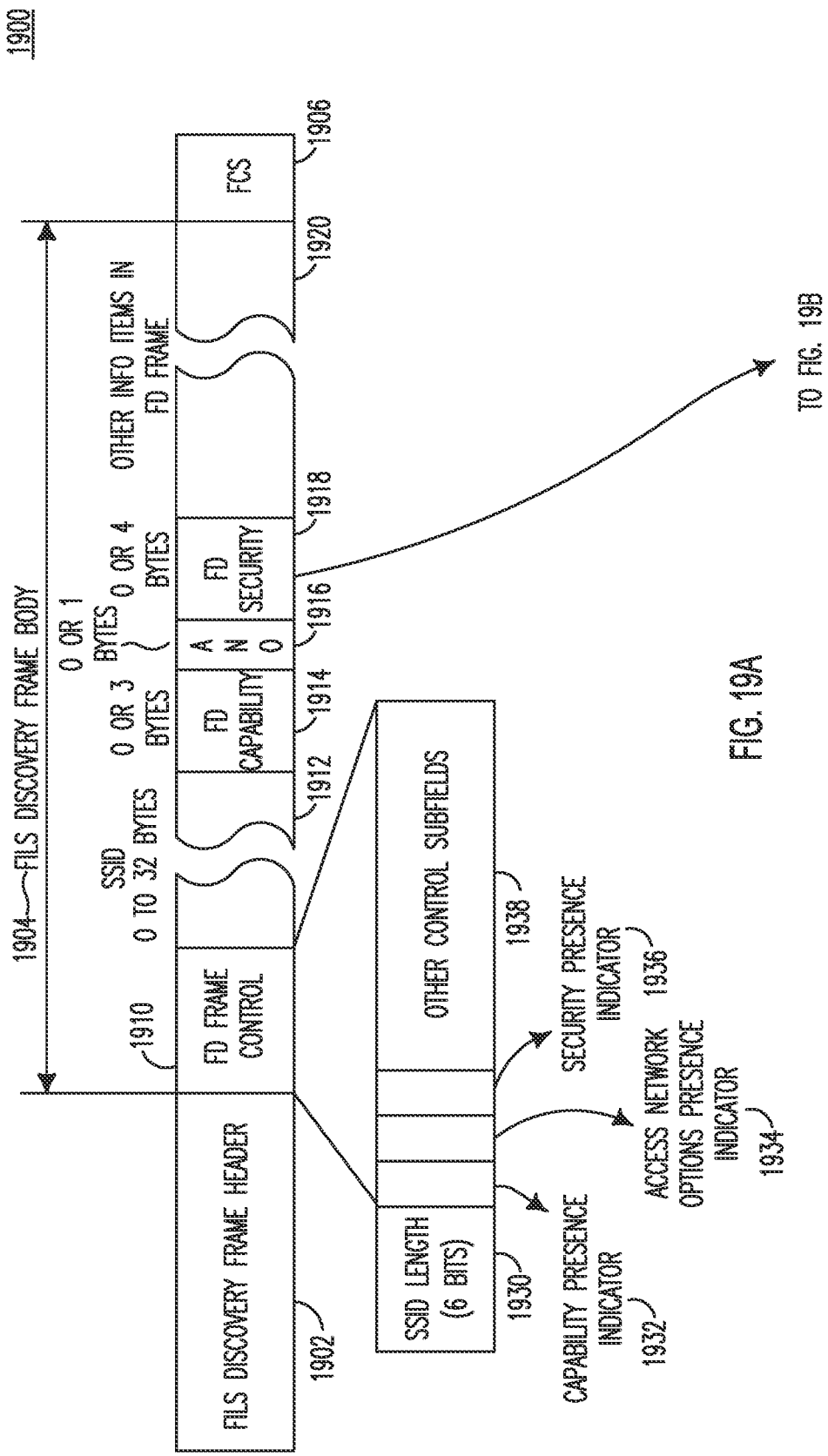

FIGS. 19A-19B show an example of an FD frame 1900 including a variable length FD security information item. The FD frame 1900 includes a FD frame header 1902, a FD frame body 1904, and a FCS field 1906. The FD frame body 1904 includes a FD frame control field 1910, a SSID field 1912, a FD capability field 1914, an ANO field 1916, a FD security field 1918, and other information items 1920. It is noted that the other information items 1920 are optional, and in some embodiments, the other information items 1920 may be omitted from the FD frame body 1904.

The FD frame control field 1910 includes a SSID length subfield 1930, a capability presence indicator subfield 1932, an ANO presence indicator subfield 1934, a security presence indicator subfield 1936, and other control subfields 1938.

The FD security field 1918 includes a RSNE length subfield 1940, a RSNC length subfield 1942, a group data cipher suite selector subfield 1944, a pairwise cipher suite selector 1 subfield 1946, and an AKM suite selector 1 subfield 1948.

The FD security field 1918 optionally includes a variable length FD RSN capabilities subfield 1950, a pairwise cipher suite selector 2 subfield 1952, an AKM suite selector 2 subfield 1954, and a group management cipher suite selector subfield 1956. The FD RSN capabilities subfield 1950 includes a pre-authentication subfield 1960, a management frame protection required subfield 1962, a management frame protection capable subfield 1964, a FILS fast EAP subfield 1966, a FILS EAP-RP subfield 1968, a FILS non-EAP subfield 1970, a FILS authentication without third party subfield 1972, a perfect forward secrecy subfield 1974, and a reserved subfield 1976.

In FIG. 19B, subfields 1950-1956 and 1976 are shown in dashed outline, to indicate that they are optional items in the FD frame 1900. To the extent that the FD RSN capabilities subfield 1950 is included in the FD frame 1900, subfields 1960-1974 are mandatory, while the reserved subfield 1976 remains optional.

The TBTT information is generally provided as timestamp value based on a common clock synchronized between the AP and the STA. But the timestamp information is not expected to be present in the FD frame. In addition, the FD frame is intended to be the first frame received by a STA in initial link setup. Therefore, a timestamp-based parameter is not an appropriate method to indicate the next TBTT information in the FD frame.

To signal the next TBTT information without requiring synchronization between the AP and the STA, a one byte offset value of the time offset between the FD frame transmission time and the next beacon frame transmission time may be used, as the FD AP's next TBTT information item in the FD frame. The offset value is the time in time units (TUs), for example, 1024 μs. A one bit indicator may be used in the FD frame control field to indicate the presence of the AP's next TBTT information field in the FD frame.

Figure 20:
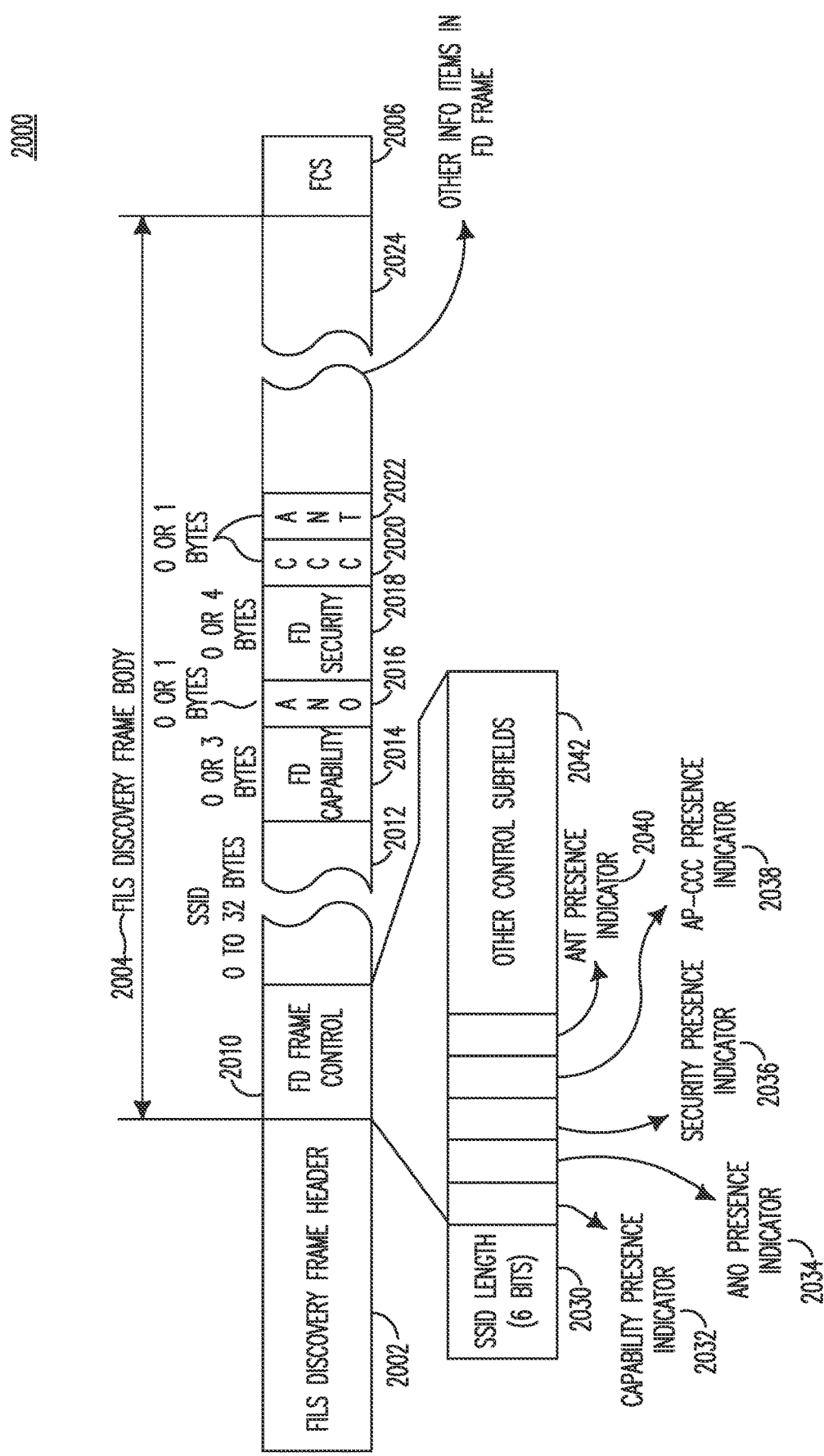
FIG. 20 is a diagram of a FD frame AP's next TBTT information item format.

FIG. 20 shows an example FD frame 2000 including the AP's next TBTT information item. The FD frame 2000 includes a FD frame header 2002, a FD frame body 2004, and a FCS field 2006. The FD frame body 2004 includes a FD frame control field 2010, a SSID field 2012, a FD capability field 2014, an ANO field 2016, a FD security field 2018, a configuration change count (CCC) field 2020, a FD AP next TBTT (ANT) field 2022, and other information items 2024. It is noted that the other information items 2024 are optional, and in some embodiments, the other information items 2024 may be omitted from the FD frame body 2004.

The FD frame control field 2010 includes a SSID length subfield 2030, a capability presence indicator subfield 2032, an ANO presence indicator subfield 2034, a security presence indicator subfield 2036, a CCC presence indicator subfield 2038, an ANT presence indicator subfield 2040, and other control subfields 2042.

A STA that attempts to setup a WLAN link scans a channel and receives a FD frame that contains the transmitting AP's next TBTT information. If the STA still needs further information from the AP, it may use the received next TBTT information to make an intelligent decision with regard to what to do next. For example, if the next TBTT information tells the STA there is a relatively long interval before the next TBTT (for example, more than 50 ms), then the STA may either enter a power saving state or switch to scan another channel, and then return to this channel before the next TBTT. If the next TBTT information indicates that there will be a beacon frame transmission in a short time interval (for example, less than 20 ms), then the STA may decide to continue monitoring this channel to receive the next beacon frame or enter a power saving state and return to this channel in time for the next beacon frame. In addition, the next TBTT information provided in the FD frame may effectively reduce the number of probe request transmissions.

The FD neighbor AP information item is intended to facilitate fast scanning of multiple APs/channels during initial link setup. There are two basic design questions for the FD neighbor AP information item: how to identify a neighbor AP and what information about a neighbor AP is needed in the FD frame. Similar to the other information items in the FD frame, it is desirable to keep the FD neighbor AP information item small in size.

The neighbor AP's next TBTT for each neighbor AP is the minimum information required in the FD frame. Due to the un-synchronized state between the STA and the AP when the FD frame is received, a value from the transmitting AP's timestamp or the neighbor AP's timestamp cannot be used to indicate the neighbor AP's next TBTT. Therefore, an offset time value between the FD frame transmission time and neighbor AP's TBTT may be used. The neighbor APs' information may be collected by the transmitting AP through communications with the neighbor APs or with third parties, for example, non-AP STAs or other network elements. When the transmitting AP has the proper information about neighbor APs' TBTTs and it decides to include the information in a FD frame transmission, it calculates the offset value between the FD frame transmission time and a neighbor AP's next TBTT, based on its system clock time value, the estimated FD frame transmission time, and the pre-collected neighbor AP's TBTT information.

Two parameters, operating class and channel number, may be used to identify a neighbor AP. The operating class may be a one byte enumerated value specifying the operating class of the neighbor AP. The channel number may be a one byte enumerated value specifying the operating channel within the operating class of the neighbor AP.

To provide a sufficient amount of neighbor information while attempting to keep the size of the FD frame small, the number of neighbors included in the neighbor AP information item may be limited to, for example, up to two neighbor APs. To indicate the presence of the FD neighbor AP information item and the number of included neighbor APs, a control subfield in the FD frame control field may be used, whose size depends on the maximum allowed number of neighbor APs in the FD neighbor AP information item. For example, if the maximum allowed number of neighbor APs is k, then an n-bit control subfield is needed, where n is the smallest integer to satisfy $2^n \geq (k+1)$.

Figure 21:
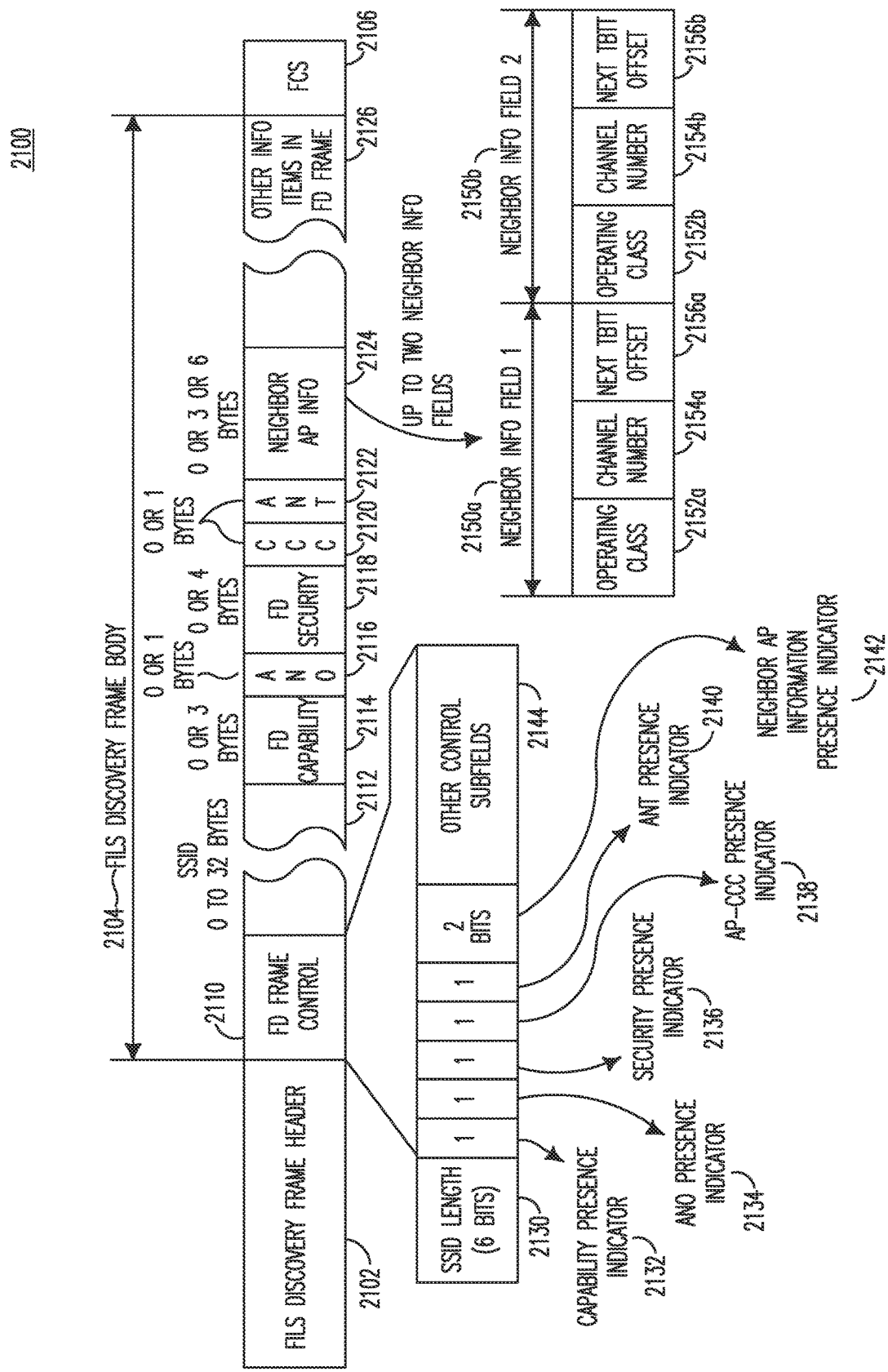
FIG. 21 is a diagram of a FD frame neighbor AP information item format.

FIG. 21 shows an example of a FD frame 2100 including a FD neighbor AP information item. The FD frame 2100 includes a FD frame header 2102, a FD frame body 2104, and a FCS field 2106. The FD frame body 2104 includes a FD frame control field 2110, a SSID field 2112, a FD capability field 2114, an ANO field 2116, a FD security field 2118, a CCC field 2120, a FD ANT field 2122, a neighbor AP information field 2124, and other information items 2126. It is noted that the other information items 2126 are optional, and in some embodiments, the other information items 2126 may be omitted from the FD frame body 2104.

The FD frame control field 2110 includes a SSID length subfield 2130, a capability presence indicator subfield 2132, an ANO presence indicator subfield 2134, a security presence indicator subfield 2136, a CCC presence indicator subfield 2138, an ANT presence indicator subfield 2140, a neighbor AP information presence indicator subfield 2142, and other control subfields 2144. The neighbor AP information presence indicator subfield 2142 is used to indicate whether neighbor AP information is present and the number of neighbor APs included in the neighbor AP information field 2124.

In one implementation, the neighbor AP information field 2124 includes neighbor AP information for up to two neighbor APs, 2150a and 2150b. The neighbor AP information 2150 includes an operating class subfield 2152, a channel number subfield 2154, and a next TBTT offset subfield 2156. The operating class and the channel number of a neighbor AP may be the same as the transmitting AP's operating channel, in which case the neighbor AP is operating on the same channel. Similarly, when multiple neighbor APs are included, some of them may have the same parameter values for operating class and channel number, but with different next TBTT offset values.

The included neighbor APs may be selected from among all the neighbor APs, based on their next TBTT offsets relative to each other and to the current AP's next TBTT offset. For example, with up to two neighbor APs' TBTT information, plus the transmitting AP's next TBTT information, there are up to three APs' TBTT information included in a FD frame. Assume that T denotes the typical channel scanning time plus the time used to switch channels during the scanning process. The two neighbor APs, AP-a and AP-b, may be selected from among the neighbor APs, such that AP-a's next TBTT (TBTT-a) and AP-b's next TBTT (TBTT-b) are apart from each other and from the transmitting AP's next TBTT with a predefined interval, for example, T. The sum of the offsets between the FD frame transmission time and the next TBTTs of the selected neighbor APs is less than or equal to any other selected neighbor APs.

Other alternative neighbor AP selection schemes may also be used. For example, the AP that transmits the FD frame may select the neighbor APs to be included in its FD neighbor AP information item based on the neighbor AP's traffic load, signal strength, security features, capabilities, etc.

In addition to the information items described above, other information items may be included in the FD frame, either as mandatory or optional fields, to provide further information to a STA and allowing the STA to improve initial link setup. Similarly, a corresponding control subfield may be included in the FD frame control field to support decoding and interpretation of the information items, i.e., whether they are optional information items, and if they are of variable size.

Figure 22:
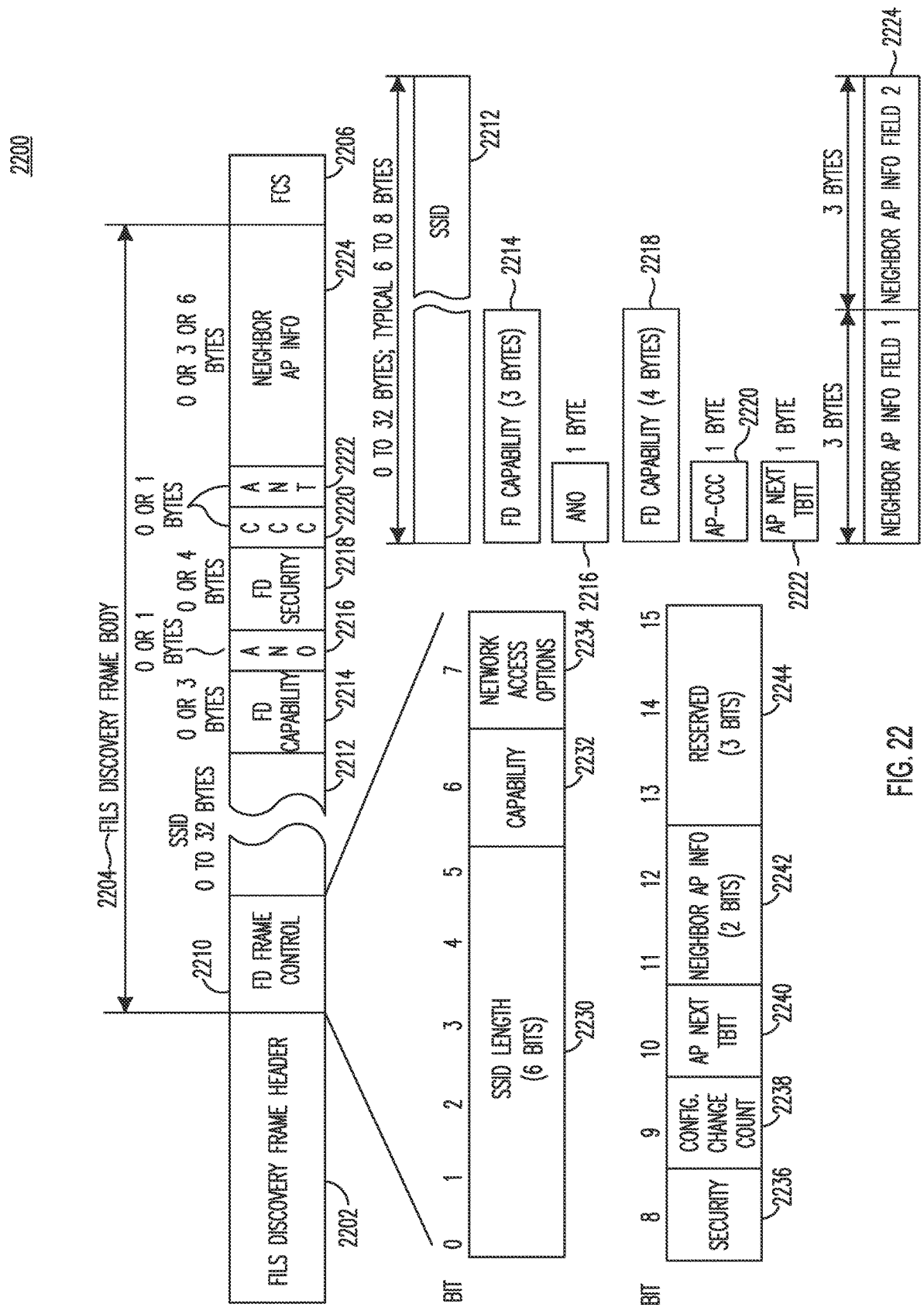
FIG. 22 is a diagram of an exemplary FD frame body format.

FIG. 22 shows an example of an FD frame 2200. The FD frame 2200 includes a FD frame header 2202, a FD frame body 2204, and a FCS field 2206. The FD frame body 2204 includes a FD frame control field 2210, a SSID field 2212, a FD capability field 2214, an ANO field 2216, a FD security field 2218, a CCC field 2220, a FD ANT field 2222, and a neighbor AP information field 2224.

The FD frame control field 2210 includes a SSID length subfield 2230, a capability presence indicator subfield 2232, an ANO presence indicator subfield 2234, a security presence indicator subfield 2236, a CCC presence indicator subfield 2238, an ANT presence indicator subfield 2240, a neighbor AP information presence indicator subfield 2242, and reserved subfields 2244.

The ANO field 2216 may be a one byte field identifying the access network type, an indication whether the network provides Internet connectivity, an indication whether the network requires an additional step for access, an indication whether emergency services are reachable through the AP, and an indication whether unauthorized emergency services are reachable through the AP. The AP CCC field 2220 may be a one byte unsigned integer, incrementing every time when the set of AP configuration parameters changes.

Based on the FD frame body 2204 design in FIG. 22 and assuming a typical SSID field 2212 of eight bytes, then without any optional information items, i.e., with the SSID field 2212 only, the FD frame body 2204 size is ten bytes. If all the optional information items (2214-2224) are included, the FD frame body 2204 size is 26 bytes, which is also the maximum FD frame body size for a typical SSID.

Based on system traffic measurement, approximately 75% of beacon frames are 158 bytes in length. Since the MAC framing overhead is 28 bytes (including the management frame MAC header and the FCS), a typical beacon frame body size is about 130 bytes. Therefore, the FD frame body as shown in FIG. 22 is approximately 7.7% of a typical beacon frame body size (130 bytes) if no optional information items are included. The FD frame body is 20% of a typical beacon frame body size (130 bytes) if all the optional information items are included.

The FD frame body design is extensible when additional information items are needed in the FD frame. There are two mechanisms to support an extensible FD frame body design. In one option, the available bits in the FD frame control field are used, which are either the previously reserved bits or new bits from extending the size of the FD frame control field. In a second option, IEs are used for each information item consisting of three components: element ID, length, and body.

Figure 23:
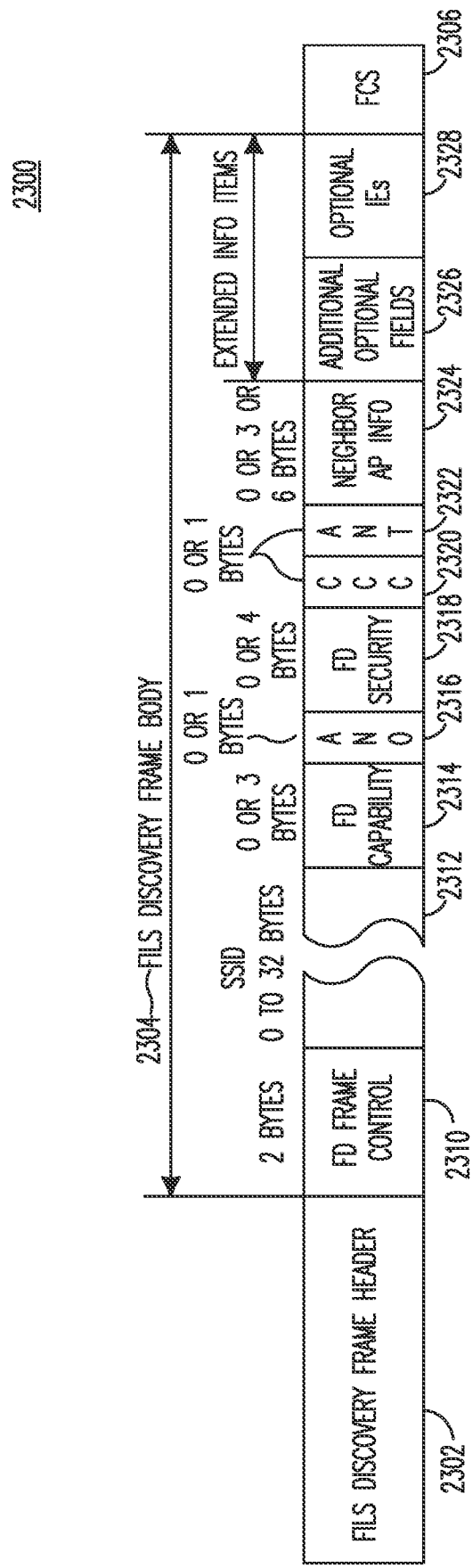
FIG. 23 is a diagram of an extendable FD frame body format.

FIG. 23 shows an example of an FD frame 2300 with extended information items. The FD frame 2300 includes a FD frame header 2302, a FD frame body 2304, and a FCS field 2306. The FD frame body 2304 includes a FD frame control field 2310, a SSID field 2312, a capability field 2314, an ANO field 2316, a security field 2318, a CCC field 2320, an ANT field 2322, a neighbor AP information field 2324, additional optional fields 2326, and optional IEs 2328.

With the FD frame body extensibility, the AP may flexibly include additional information items in the FD frame to facilitate FILS and/or reduce the number of probe request/response frame transmissions. One example of the additional optional information items may be time synchronization information, for example, a full timestamp value or some form of condensed timestamp information. Another example is BSS load information, either using the existing BSS load related IEs or introducing a new optional information field or element with enhanced BSS load information selections and encodings.

Figure 24:
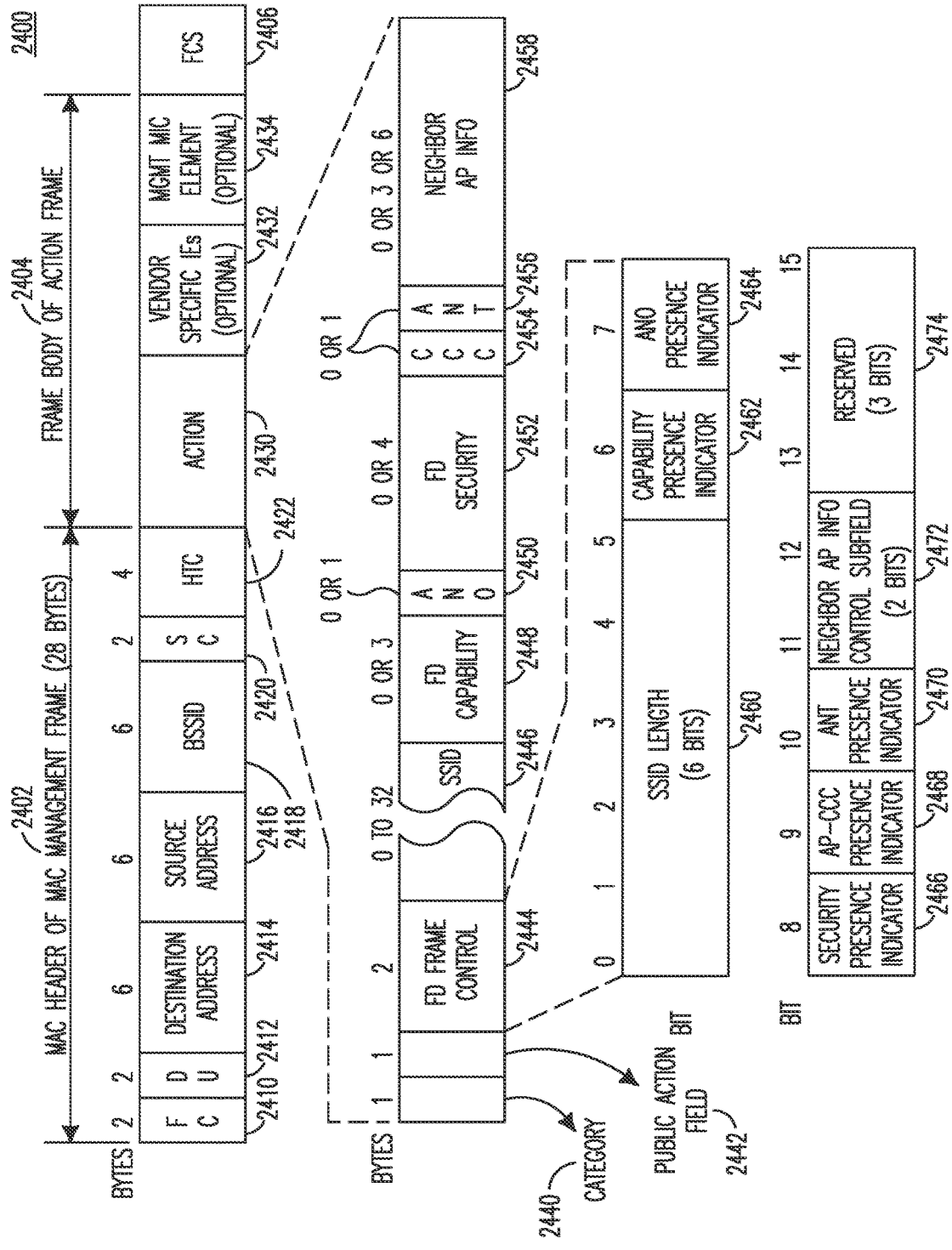
FIG. 24 is a diagram of a FD frame in a public action frame format.

The FD frame may be designed as a public action frame or an extension frame. The public action frame is a MAC management frame. There are some unused codes in the "public action field" which are currently reserved. A new public action frame may be defined by using one of the reserved codes. FIG. 24 shows an example of encoding a FD frame 2400 as a new public action frame, where the public action field=16 is assigned to the FD frame 2400.

The FD frame 2400 includes a MAC header 2402, a frame body 2404, and a FCS field 2406. The MAC header 2402 includes a frame control field 2410, a duration/ID (DU) field 2412, a destination address field 2414, a source address field 2416, a BSSID field 2418, a sequence control (SC) field 2420, and a HT control (HTC) field 2422. The frame body 2404 includes an action field 2430, one or more optional vendor-specific IEs 2432, and an optional management message integrity code (MIC) element 2434.

The action field includes a category field 2440, a public action field 2442, a FD frame control field 2444, a SSID field 2446, a capability field 2448, an ANO field 2450, a security field 2452, a CCC field 2454, an ANT field 2456, and a neighbor AP information field 2458. The FD frame control field 2444 includes a SSID length subfield 2460, a capability presence indicator subfield 2462, an ANO presence indicator subfield 2464, a security presence indicator subfield 2466, a CCC presence indicator subfield 2468, an ANT presence indicator subfield 2470, a neighbor AP information presence indicator subfield 2472, and reserved subfields 2474.

An 802.11g-based MAC header is used in FIG. 24, for demonstration purposes. In 802.11n WLAN systems with HT_GF or HT_MF PPDUs, a four byte HT control field is also included in the MAC header of MAC management frames.

The extension frame is a MAC frame type which uses the type=0b11 in the frame control field of the MAC header. With a four bit subtype field, there are up to 16 extension frames that may be defined. One available subtype value of the extension frame, for example, subtype=0b0010, may be used to define the FD frame as a new extension frame.

Multiple alternative detailed MAC framing designs are possible for the FD extension frame, including a separate frame control (FC) field and a specific FD frame control field and a combined FC field. One difference between these designs is how the frame control information is organized, particularly, whether or not the general frame control information and FD frame-specific control information are separated or combined.

Figure 25:
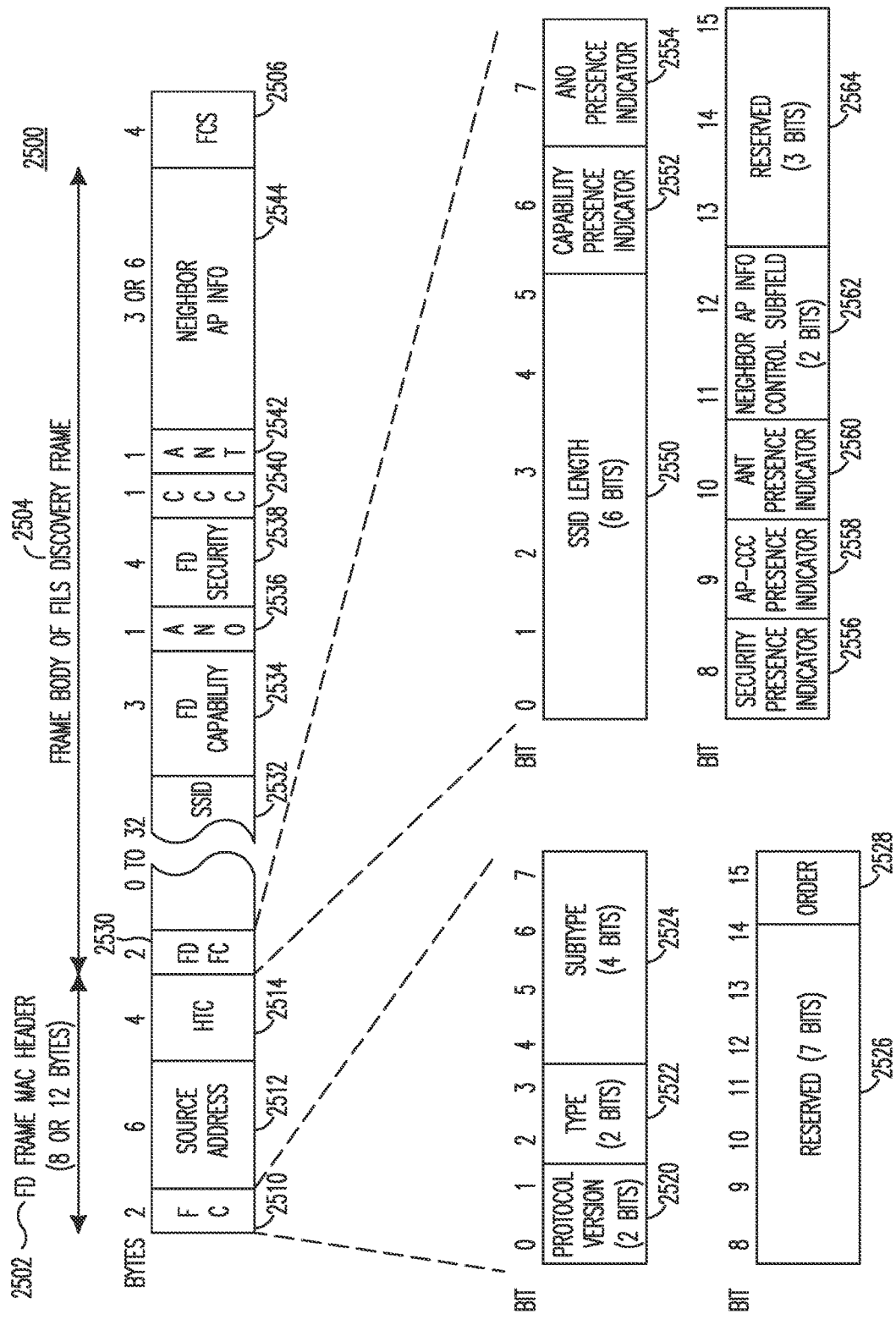
FIG. 25 is a diagram of a FD extension frame format with a separate frame control field.

FIG. 25 shows a FD frame 2500 design with a separate FC field and a FD frame specific frame control field (FD FC). The FD frame 2500 includes a MAC header 2502, a frame body 2504, and a FCS field 2506. The MAC header 2502 includes a frame control field 2510, a source address field 2512, and a HTC field 2514. The source address field 2512 contains the MAC address of the transmitting STA of the FD frame, which is also the BSSID of the AP STA of an infrastructure BSS. In one implementation, the source address field 2512 is six bytes long. The frame control field 2510 includes a protocol version subfield 2520, a type subfield 2522, a subtype subfield 2524, a reserved portion 2526, and an order subfield 2528. The order subfield 2528 is used to indicate if HTC is present.

The frame body 2504 includes a FD frame control field 2530, a SSID field 2532, a FD capability field 2534, an ANO field 2536, a FD security field 2538, a CCC field 2540, an ANT field 2542, and a neighbor AP information field 2544. The FD frame control field 2530 includes a SSID length subfield 2550, a capability presence indicator subfield 2552, an ANO presence indicator subfield 2554, a security presence indicator subfield 2556, a CCC presence indicator subfield 2558, an ANT presence indicator subfield 2560, a neighbor AP information presence indicator subfield 2562, and reserved subfields 2564.

The first byte of the frame control field 2510 in the MAC header 2502 is the generic frame control (FC) field of the FD extension frame, which is of the same format as the first byte of other MAC frames, including management frames, control frames, and data frames. Using this format is important for a receiving STA to identify a received frame using the information in the frame control field, for example, type and subtype. If it is a known frame type, then the receiving STA may use the frame control information to decode the rest of the received frame. If it is an unknown frame type, the receiving STA skips over the frame using the length information given in the PLOP header or MPDU delimiter in an aggregate MPDU (A-MPDU).

The second byte of the frame control field 2510 is also generic, and contains the order subfield 2528, which is used to indicate whether a four byte HTC field is present. The other seven bits in the second byte of the frame control field 2510 are reserved or may be used for other purposes, because the original subfields do not apply for the FD frame.

Figure 26:
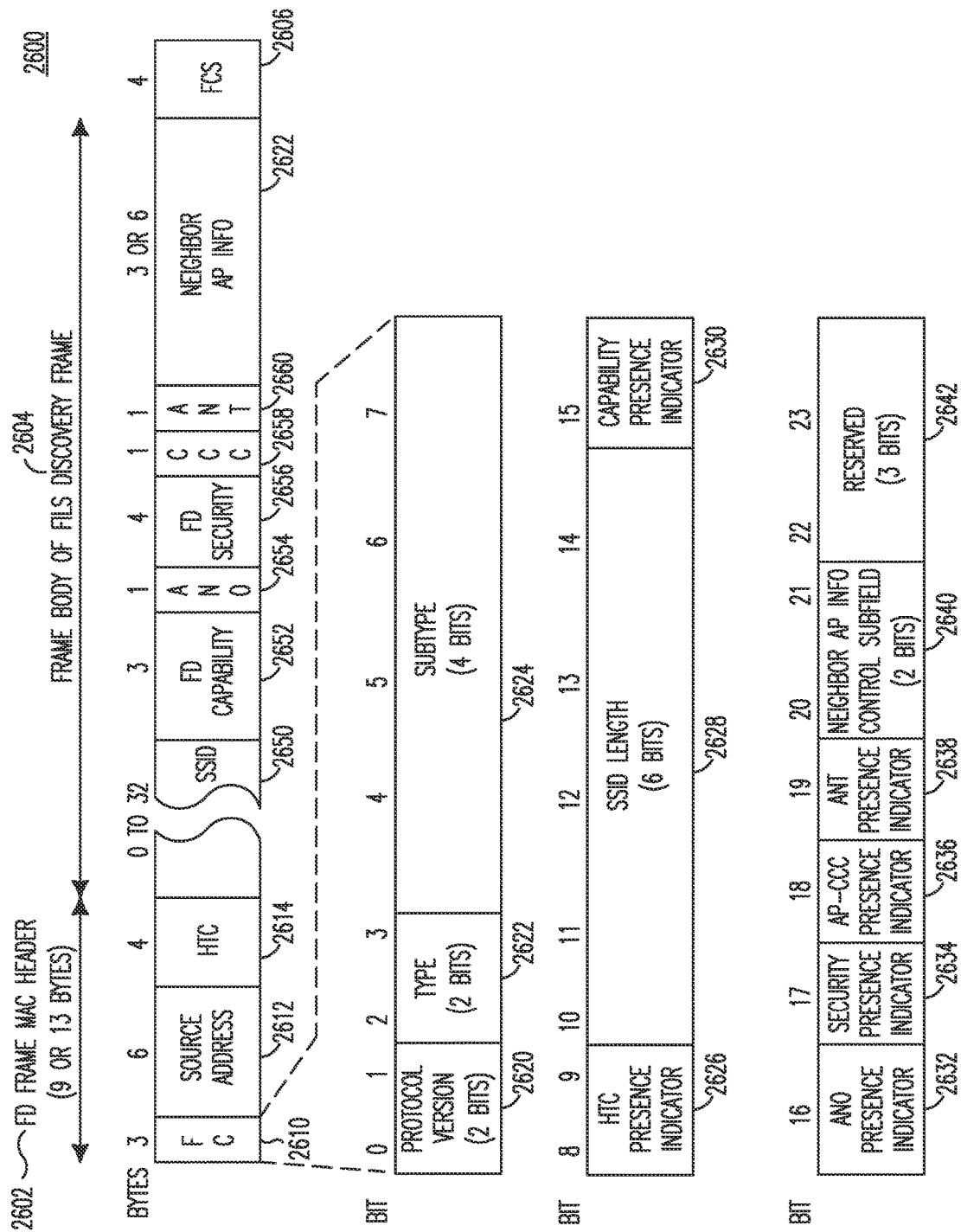
FIG. 26 is a diagram of a FD extension frame format with a combined frame control field.

FIG. 26 shows a FD extension frame 2600 design with a combined frame control field with generic frame control information and FD frame specific frame control information. The FD frame 2600 includes a MAC header 2602, a frame body 2604, and a FCS field 2606. The MAC header 2602 includes a frame control field 2610, a source address field 2612, and a HTC field 2614.

The frame control field 2610 includes a protocol version subfield 2620, a type subfield 2622, a subtype subfield 2624, a HTC presence indicator subfield 2626, a SSID length subfield 2628, a capability presence indicator subfield 2630, an ANO presence indicator subfield 2632, a security presence indicator subfield 2634, a CCC presence indicator subfield 2636, an ANT presence indicator subfield 2638, a neighbor AP information presence indicator subfield 2640, and reserved subfields 2642. The first byte of the frame control field 2610 has the same format as all other MAC frames. It contains the information for a receiving STA to identify the received frame and process it accordingly.

The frame body 2604 includes a SSID field 2650, a FD capability field 2652, an ANO field 2654, a FD security field 2656, a CCC field 2658, an ANT field 2660, and a neighbor AP information field 2662.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for fast initial link setup (FILS) for use in a wireless station, the method comprising:
   receiving a FILS discovery (FD) frame from an access point (AP), wherein the FD frame comprises an FD frame control field and FD frame contents, wherein the FD frame control field comprises a capability presence indicator indicating whether a FD capability field is present in the FD frame contents, and wherein the FD frame contents comprise the FD capability field and a service set identifier (SSID) field which comprises a full SSID or a short SSID;
   determining to associate with the AP based on the received FD frame; and
   transmitting an association request frame to the AP.

2. The method of claim 1, wherein the capability presence indicator indicates that the FD capability field is present in the FD frame contents, and the FD capability field comprises at least a physical layer (PHY) type subfield.

3. The method of claim 2, wherein the FD capability field further comprises a supported minimum rate subfield indicating a supported minimum rate used for communication with the AP.

4. The method of claim 2, further comprising:
   determining a supported minimum rate based on a PHY type indicated in the PHY type subfield.

5. The method of claim 2, wherein the FD capability field further comprises an extended service set (ESS) subfield.

6. The method of claim 2, wherein the FD capability field further comprises a privacy subfield.

7. The method of claim 1, wherein the FD frame control field further comprises:
   an access network options presence indicator indicating whether an access network options field is present in the FD frame contents;
   a security presence indicator indicating whether a security field is present in the FD frame contents; and
   an AP configuration change count presence indicator indicating whether an AP configuration change count field is present in the FD frame contents.

8. The method of claim 7, wherein the FD frame contents comprise at least one of:
   the access network options field that indicates an access service provided by the AP;
   the security field that indicates one or more types of security used by the AP; and
   the AP configuration change count field that indicates a number of times that a set of AP configuration parameters has changed.

9. The method of claim 1, wherein the FD frame control field comprises an SSID indicator that indicates whether the SSID field comprises a full SSID or a short SSID, and wherein the FD frame control field comprises an SSID length field that indicates a size of the SSID field.

10. The method of claim 1, wherein the FD frame is received, from the AP, between instances of a beacon frame.

11. A wireless station, comprising:
   a receiver configured to receive a FILS discovery (FD) frame from an access point (AP), wherein the FD frame comprises an FD frame control field and FD frame contents, wherein the FD frame control field comprises a capability presence indicator indicating whether a FD capability field is present in the FD frame contents, and wherein the FD frame contents comprise the FD capability field and a service set identifier (SSID) field which comprises a full SSID or a short SSID;
   a processor configured to determine to associate with the AP based on the received FD frame; and
   a transmitter configured to transmit an association request frame to the AP.

12. The wireless station of claim 11, wherein the capability presence indicator indicates that the FD capability field is present in the FD frame contents, and the FD capability field comprises at least a physical layer (PHY) type subfield.

13. The wireless station of claim 12, wherein the FD capability field further comprises a supported minimum rate subfield indicating a supported minimum rate used for communication with the AP.

14. The wireless station of claim 12, wherein the processor is further configured to determine a supported minimum rate based on a PHY type indicated in the PHY type subfield.

15. The wireless station of claim 12, wherein the FD capability field further comprises an extended service set (ESS) subfield.

16. The wireless station of claim 12, wherein the FD capability field further comprises a privacy subfield.

17. The wireless station of claim 11, wherein the FD frame control field further comprises:
   an access network options presence indicator indicating whether an access network options field is present in the FD frame contents;
   a security presence indicator indicating whether a security field is present in the FD frame contents; and
   an AP configuration change count presence indicator indicating whether an AP configuration change count field is present in the FD frame contents.

18. The wireless station of claim 17, wherein the FD frame contents comprise at least one of:
   the access network options field that indicates an access service provided by the AP;
   the security field that indicates one or more types of security used by the AP; and
   the AP configuration change count field that indicates a number of times that a set of AP configuration parameters has changed.

19. The wireless station of claim 11, wherein the FD frame control field comprises an SSID indicator that indicates whether the SSID field comprises a full SSID or a short SSID, and wherein the FD frame control field comprises an SSID length field that indicates a size of the SSID field.

20. The wireless station of claim 11, wherein the receiver is configured to receive the FD frame, from the AP, between instances of a beacon frame.

* * * * *